United States Patent
Yoshida

(10) Patent No.: US 11,151,064 B2
(45) Date of Patent: Oct. 19, 2021

(54) INFORMATION PROCESSING APPARATUS AND STORAGE DEVICE ACCESS CONTROL METHOD

(71) Applicant: Kioxia Corporation, Tokyo (JP)

(72) Inventor: Hideki Yoshida, Yokohama Kanagawa (JP)

(73) Assignee: KIOXIA CORPORATION, Tokyo (JP)

(*) Notice: Subject to any disclaimer, the term of this patent is extended or adjusted under 35 U.S.C. 154(b) by 0 days.

(21) Appl. No.: 16/783,988

(22) Filed: Feb. 6, 2020

(65) Prior Publication Data

US 2021/0042246 A1   Feb. 11, 2021

(30) Foreign Application Priority Data

Aug. 9, 2019   (JP) .............................. JP2019-147496

(51) Int. Cl.
| | | |
|---|---|---|
| *G06F 13/38* | (2006.01) | |
| *G06F 13/16* | (2006.01) | |
| *G06F 13/42* | (2006.01) | |

(52) U.S. Cl.
CPC ...... *G06F 13/1668* (2013.01); *G06F 13/4282* (2013.01); *G06F 2213/0026* (2013.01)

(58) Field of Classification Search
CPC ............. G06F 13/1668; G06F 13/4282; G06F 2213/0026; G06F 12/00
See application file for complete search history.

(56) References Cited

U.S. PATENT DOCUMENTS

| | | | |
|---|---|---|---|
| 10,860,511 B1* | 12/2020 | Thompson | .......... G06F 13/4282 |
| 2017/0177216 A1 | 6/2017 | Freyensee et al. | |
| 2018/0335971 A1 | 11/2018 | Borikar | |
| 2019/0073160 A1 | 3/2019 | Okada | |
| 2019/0087323 A1 | 3/2019 | Kanno et al. | |
| 2019/0303309 A1* | 10/2019 | Sahoo | ..................... H04L 47/52 |

OTHER PUBLICATIONS

NVM EXpress™ Base Specification, 2007-2018 NVM Express, Inc., NVM Express™ Revision 1.3c, May 24, 2018, pp. 1-292.
Ziye Yang et al., "SPDK: A development kit to build high performance storage applications", 2017 IEEE 9th International Conference on Cloud Computing Technology and Science, pp. 154-161.

(Continued)

*Primary Examiner* — Cheng Yuan Tseng
(74) *Attorney, Agent, or Firm* — Kim & Stewart LLP

(57) ABSTRACT

A computing device includes a memory and a processor connected to the memory and configured to: create, in a first memory space of the memory, a first I/O submission queue associated with a first application running in user space; create, in a second memory space of the memory, a second I/O submission queue associated with a second application running in user space; in response to a first I/O request from the first application, store the first I/O request in the first I/O submission queue for access by the semiconductor storage device; and in response to a second I/O request from the second application, store the second I/O request in the second I/O submission queue for access by the semiconductor storage device.

20 Claims, 16 Drawing Sheets

(56) References Cited

OTHER PUBLICATIONS

Storage Performance Development Kit (SPDK), Retrieved from the Internet, URL: https://spdk.io/ [retrieved on Feb. 14, 2020], 2 pages.
VFIO—"Virtual Function I/0", The Linux Kernel Organization, Inc., Retrieved from the internet, URL: https://www.kernel.org/doc/Documentation/vfio.txt [retrieved on Jan. 22, 2020], 8 pages.
Matias Bjorling et al., "LightNVM: The Linux Open-Channel SSD Subsystem", 15th USENIX Conference on File and Storage Technologies (FAST '17), Feb. 27-Mar. 2, 2017, USENIX Association, Santa Clara, CA, USA, pp. 359-373.

* cited by examiner

INFORMATION PROCESSING APPARATUS AND STORAGE DEVICE ACCESS CONTROL METHOD

CROSS-REFERENCE TO RELATED APPLICATION

This application is based upon and claims the benefit of priority from Japanese Patent Application No. 2019-147496, filed on Aug. 9, 2019, the entire contents of which are incorporated herein by reference.

FIELD

Embodiments described herein relate generally to a technology for controlling access to a semiconductor storage device.

BACKGROUND

Semiconductor storage devices with nonvolatile memory are widely used. A solid state drive (SSD) based on NAND flash technology is known as one of these types of semiconductor storage devices. An SSD is used as a storage device in various host computer systems such as a server in a data center. In a host computer system such as a server, a single SSD may be shared by multiple applications.

DETAILED DESCRIPTION

Example embodiments provide information processing apparatuses and control methods capable of improving performance related to writing and reading of data in a semiconductor storage device.

In general, according to an embodiment, a computing device includes a memory and a processor connected to the memory and configured to: create, in a first memory space of the memory, a first I/O submission queue associated with a first application running in user space; create, in a second memory space of the memory, a second I/O submission queue associated with a second application running in user space; in response to a first I/O request from the first application, store the first I/O request in the first I/O submission queue for access by the semiconductor storage device; and in response to a second I/O request from the second application, store the second I/O request in the second I/O submission queue for access by the semiconductor storage device.

Hereinafter, certain non-limiting example embodiments will be described with reference to the drawings.

First Embodiment

Figure 1:
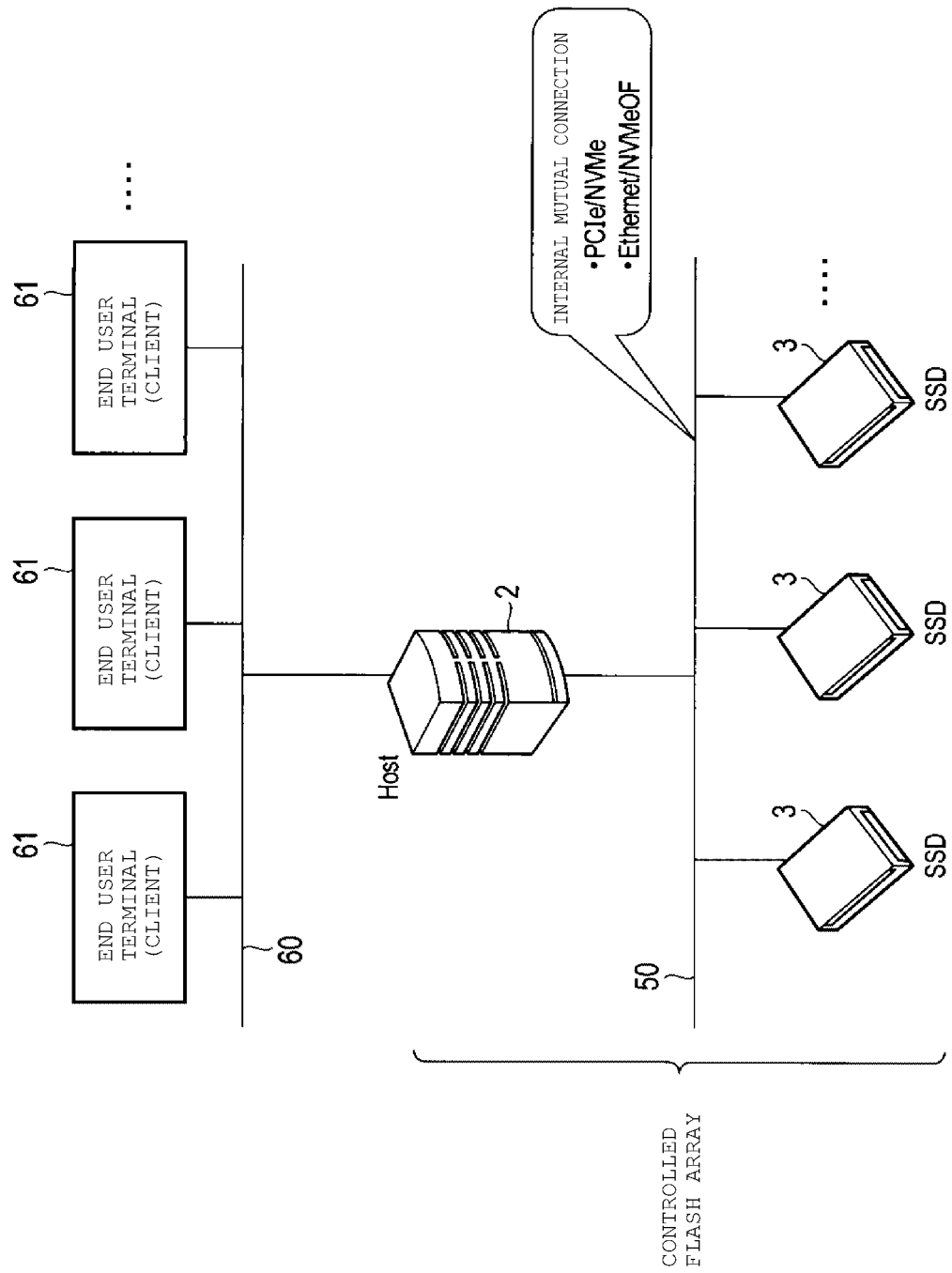
FIG. 1 is a block diagram illustrating a relationship between an information processing apparatus according to a first embodiment and a semiconductor storage device.

FIG. 1 is a block diagram illustrating a relationship between an information processing apparatus according to a first embodiment and a semiconductor storage device.

The information processing apparatus, which may be referred to as a computing device or a server, operates as a host 2 (also referred to as a host device 2 in some contexts) for issuing a write/read request (also referred to as a write/read command in some contexts) to a semiconductor storage device. The semiconductor storage device is implemented in this example as a solid state drive (SSD) 3 using NAND flash technology. The SSD 3 includes a nonvolatile memory and a controller controlling the nonvolatile memory. The SSD 3 is configured to write data into the nonvolatile memory and read data from the nonvolatile memory.

The host 2 can connect to one or a plurality of SSDs 3. The host 2 is configured to control the one or the plurality of SSDs 3. The host 2 may be configured to use a flash array comprising the plurality of SSDs 3 as a storage unit.

The host 2 may be a personal computer or a server computer. Each SSD 3 may be connected to the host 2 directly through a cable or via a network. Alternatively, each SSD 3 may be incorporated in (integrated within) the host 2.

In the described example, the case where an information processing apparatus operating as a server computer is used as the host 2 will be described.

In this example, the host 2 and a plurality of SSDs 3 are mutually connected through an interface 50 (internal mutual connection). The interface 50 type used for the mutual connection is not a limitation. For example, PCI Express (PCIe®), NVM Express (NVMe®), Ethernet®, NVMe over Fabrics (NVMeOF), or the like may be used as the interface 50. That is, the SSD 3 may be connected to the host 2 through a bus (serial bus), such as PCIe, or may be connected to the host 2 through a network such as NVMeOF. For any of the bus connection/network connection, a protocol defined in the NVMe specifications may be used in communication between each SSD 3 and the host 2.

A typical example of a server computer functioning as the host 2 is exemplified by a server computer (also referred to as a server) in a data center.

In a case in which the host 2 is implemented as a server in a data center, the host 2 (server) may be connected to a plurality of end user terminals 61 (also referred to as clients) through a network 60. The host 2 can provide various services and/or applications to the end user terminals 61.

Examples of the services that the host 2 can provide include: (1) platform as a service (PaaS) for providing a system operating platform to each client (that is, each end user terminal 61), (2) infrastructure as a service (IaaS) for providing an infrastructure such as a virtual server to each client (that is, each end user terminal 61), and the like.

In the host 2, a plurality of application programs that have read and write access to the SSD 3 can be executed. Each SSD 3 connected to the host 2 can be shared by these application programs. Examples of the application programs requiring read and write access to the SSDs 3 include database software, a virtual machine, and other various software programs.

For example, a plurality of virtual machines may be emulated on a physical server that functions as host 2. Each of the virtual machines running on the host 2 can in turn function as a virtual server configured to provide various services to particular clients (end user terminals 61) corresponding to the virtual machine. In each virtual machine, a guest operating system and an application program used by the end user terminal 61 corresponding to the virtual machine are executed. Each of the virtual machines has read and write access to SSDs 3 in accordance with a request from the application program on the virtual machine. Thus, each SSD 3 is shared between the virtual machines.

An address designation method to be used by the host 2 for accessing the SSD 3 is not limited. For example, a first address designation method in which the host 2 designates each of write target data and read target data using a logical address such as a logical block address (LBA) may be used.

Alternatively, a second address designation method in which the host 2 converts the logical address into a physical address and designates a physical address at which the write target data is to be written in the nonvolatile memory, and a physical address at which the read target data is stored in the nonvolatile memory may be used.

Alternatively, a third address designation method in which address designation for writing is different from address designation for reading may be used. In the third address designation method, a read request (read command) received from the host 2 designates a physical address (both of a block address and an in-block offset) indicating a physical storage position at which the read target data is stored in the nonvolatile memory. The block address is a block address indicating a block in which the read target data is stored in the nonvolatile memory. The in-block offset indicates a physical storage position at which the read target data is stored in the block. A write request received from the host 2 designates the block address of a write destination block into which the write target data is to be written, and the logical address of the write target data. The write request does not designate a physical storage position (in this context, also referred to as a write destination position) in the write destination block. The write destination position in the write destination block is determined by the SSD 3. The SSD 3 writes the write target data at a determined write destination position in the write destination block. The SSD 3 notifies the host 2 of a physical address (a block address and an in-block offset) indicating a physical storage position of the nonvolatile memory at which the write target data is written. The host 2 maps the physical address of the notification from the SSD 3 to the logical address of the write target data by updating a lookup table.

In the third address designation method, the write request received from the host 2 may designate only the logical address of the write target data without designating the block address of the write destination block. In this case, the SSD 3 determines both of the write destination block and the write destination position in the write destination block. The SSD 3 notifies the host 2 of a physical address (a block address and an in-block offset) indicating a physical storage position of the nonvolatile memory at which the write target data is written. The host 2 maps the physical address of the notification from the SSD 3 to the logical address of the write target data by updating a lookup table.

Figure 2:
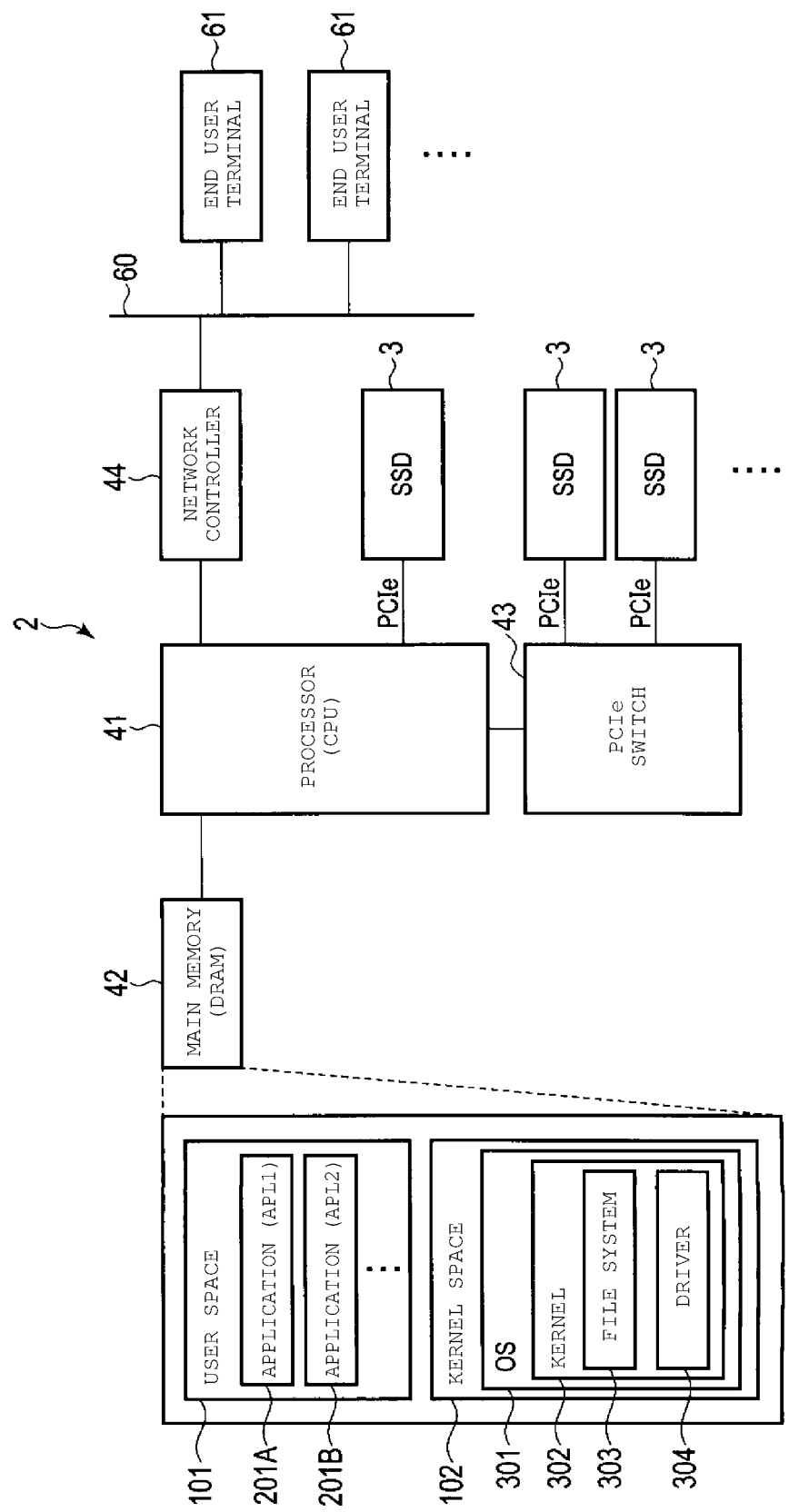
FIG. 2 is a block diagram illustrating a configuration example of the information processing apparatus according to the first embodiment.

FIG. 2 illustrates a configuration example of the host 2.

The host 2 includes a processor 41, a main memory 42 (also referred to as system memory), a PCIe switch 43, a network controller 44, and the like. The processor 41 is connected to each of the main memory 42, the PCIe switch 43, and the network controller 44.

The SSD 3 may be directly connected to a PCIe bus of the processor 41 or may be connected to a PCIe bus of the PCIe switch 43 connected to the processor 41. In FIG. 2, a case where one SSD 3 is directly connected to the PCIe bus of the processor 41, and each of the other SSDs 3 is connected to the PCIe bus of the PCIe switch 43 is illustrated.

The network controller 44 is a communication device such as a network interface card and communicates with each user terminal 61 on the network 60. In FIG. 2, a case where the plurality of SSDs 3 are connected to the PCIe bus of the host 2 is illustrated. The SSDs 3 may be connected to the network.

The processor 41 is a CPU configured to control the operation of each component in the host 2. The processor 41 executes various software (also referred to as host software) operations in the main memory 42. The main memory 42 is configured with a random access memory such as a DRAM.

The host software is broadly divided into in-kernel software represented by a kernel of an operating system (OS) and user level software such as an application program.

A memory space (or virtual memory space) managed by the processor 41 includes a user space 101 and a kernel space 102. The user level software operates in the user space 101, and the in-kernel software operates in the kernel space 102.

In FIG. 2, a case where an application program 201A (APL1) and an application program 201B (APL2) are loaded in the main memory 42 and executed is illustrated. The application programs 201A and 201B correspond to the user level software operating in the user space 101. The application programs 201A and 201B execute a process for read and write access to the SSD 3. For example, each of the application programs 201A and 201B may be database software or a virtual machine.

A management tool for managing and setting parameters of the SSD 3 may be executed in the user space 101 as user level software.

An operating system (OS) 301 operates in the kernel space 102. The OS 301 includes a kernel 302. The kernel 302 performs management of resources, such as hardware resources, of the host 2, access control and arbitration for avoiding collisions in the accessing of the resources, and the like. The kernel 302 includes a file system 303, a driver 304, and the like. The driver 304 is a device driver for controlling the SSD 3.

In a case where the host 2 accesses the SSD 3 using the second address designation method or the third address designation method, a host flash translation layer (FTL) may be executed in the kernel space 102 as an in-kernel module.

The host FTL manages mapping between the logical addresses used by the host 2 for accessing the SSD 3 and the physical addresses of the nonvolatile memories in the SSD 3 using a logical and physical address conversion table.

Communication between the host 2 and the SSD 3 is executed using queues allocated in the main memory 42. Two types of queues, that is, an I/O queue and an administration queue (also referred as an "admin queue" for simplicity), are allocated in the main memory 42. The I/O queue includes an I/O submission queue and an I/O completion queue. The admin queue includes an admin submission queue and an admin completion queue.

The I/O submission queue is used for issuing a write/read request (write/read command) to the SSD 3. The I/O completion queue is used for receiving completion responses from the SSD 3 in response to the write/read requests.

The processor 41 of the host 2 stores the write/read requests in the I/O submission queue in the main memory 42. The SSD 3 fetches a write/read request from the I/O submission queue. The SSD 3 executes a write/read operation corresponding to the fetched write/read request. When the execution of the write/read operation has been completed, the SSD 3 then causes a completion response corresponding to the now completed write/read request to be stored in the I/O completion queue. The processor 41 acquires the completion responses from the I/O completion queue.

The admin submission queue is a management submission queue used for issuing various management requests (also referred to as admin commands) to the SSD 3 for management and control of settings of the SSD 3. The admin completion queue is a management completion queue used for receiving a completion response corresponding to the management request from the SSD 3.

The processor 41 of the host 2 stores the management request in the admin submission queue. The SSD 3 fetches the management request from the admin submission queue. The SSD 3 executes an operation corresponding to the fetched management request. When the execution of the operation has been completed, the SSD 3 causes the completion response corresponding to the management request to be stored in the admin completion queue. The processor 41 acquires the completion responses from the admin completion queue.

Generally, all queues (that is, all the I/O queues and all the admin queues) are managed by driver 304 in the kernel 302.

In this case, each time the application programs 201A and 201B need to issue the write/read request to the SSD 3, each of the application programs 201A and 201B needs to call the kernel 302 using a system call.

However, the required overhead for issuing a system call each time can be avoided by having direct access to the queue from the user space. Therefore, recently, software for enabling direct access to the queue from the user space has been suggested.

However, in an environment where a plurality of application programs needing read and write access to the SSDs 3 are being executed on the host 2, if direct access to the queue for each individual application program is simply permitted, application programs sharing an SSD 3 may attempt access to the same area (entry) in the same queue at the same time. Accordingly, a request or a completion response may not be correctly transmitted between the host 2 and the SSD 3.

Likewise, events in which a request or a completion response corresponding to a particular application program is overwritten or intercepted by another application program may occur.

However, in the first embodiment, the I/O queue is not shared by the plurality of application programs sharing an SSD 3. I/O queues respectively dedicated to each of the plurality of application programs sharing the SSD 3 are allocated in a host physical memory (main memory 42).

That is, in response to an I/O submission queue creation request from the application program 201A operating in the user space 101, the processor 41 allocates an I/O submission queue for storing write/read requests from the application program 201A in a predetermined memory space of the main memory 42 particularly allocated to the application program 201A. The dedicated I/O submission queue is mapped to the memory space of the application program 201A. Thus, the application program 201A can directly operate on I/O submission queue without using a system call.

The application program 201A may directly operate the I/O submission queue allocated in the memory space of the application program 201A or may operate the I/O submission queue through a library described below.

An I/O completion queue is also allocated in the memory space of the application program 201A.

The processor 41 issues the write/read request from the application program 201A using the dedicated I/O submission queue allocated in the memory space for the application program 201A.

That is, in response to the request from the application program 201A or a request from the library described below, the processor 41 stores the write/read request from the application program 201A in the I/O submission queue for the application program 201A and notifies the SSD 3 that a new write/read request is stored in the I/O submission queue.

The SSD 3 fetches the write/read request from the I/O submission queue by using read access to the I/O submission queue in the host physical memory (main memory 42). When the SSD 3 completes an operation corresponding to a write/read request, the SSD 3 stores a completion response for the write/read request in the I/O completion queue by using write access to an I/O completion queue dedicated to the application program 201A in the host physical memory (main memory 42).

Regarding the application program 201A, the issuing of the write/read request and the reception of the completion response are executed through the dedicated I/O queues (the I/O submission queue and the I/O completion queue) allocated in the memory space of the application program 201A.

Similarly, in response to an I/O submission queue creation request from the application program 201B operating in the user space 101, the processor 41 allocates an I/O submission queue for issuing the write/read request to the SSD 3 from the application program 201B in a predetermined memory space of the main memory 42 allocated to the application program 201B. The I/O submission queue is mapped to the memory space of the application program 201B. Thus, the application program 201B can directly operate on the I/O submission queue without using a system call.

The application program 201B may directly operate the I/O submission queue allocated in the memory space of the application program 201B or may operate the I/O submission queue through a library. The I/O completion queue is also allocated in the memory space of the application program. 201B.

The processor 41 issues the write/read request from the application program 201B using the I/O submission queue allocated in the memory space for the application program 201B.

That is, the processor 41 stores the write/read request from the application program 201B in the particularly dedicated I/O submission queue and notifies the SSD 3 that a new write/read request has been stored in the I/O submission queue.

Figure 3:
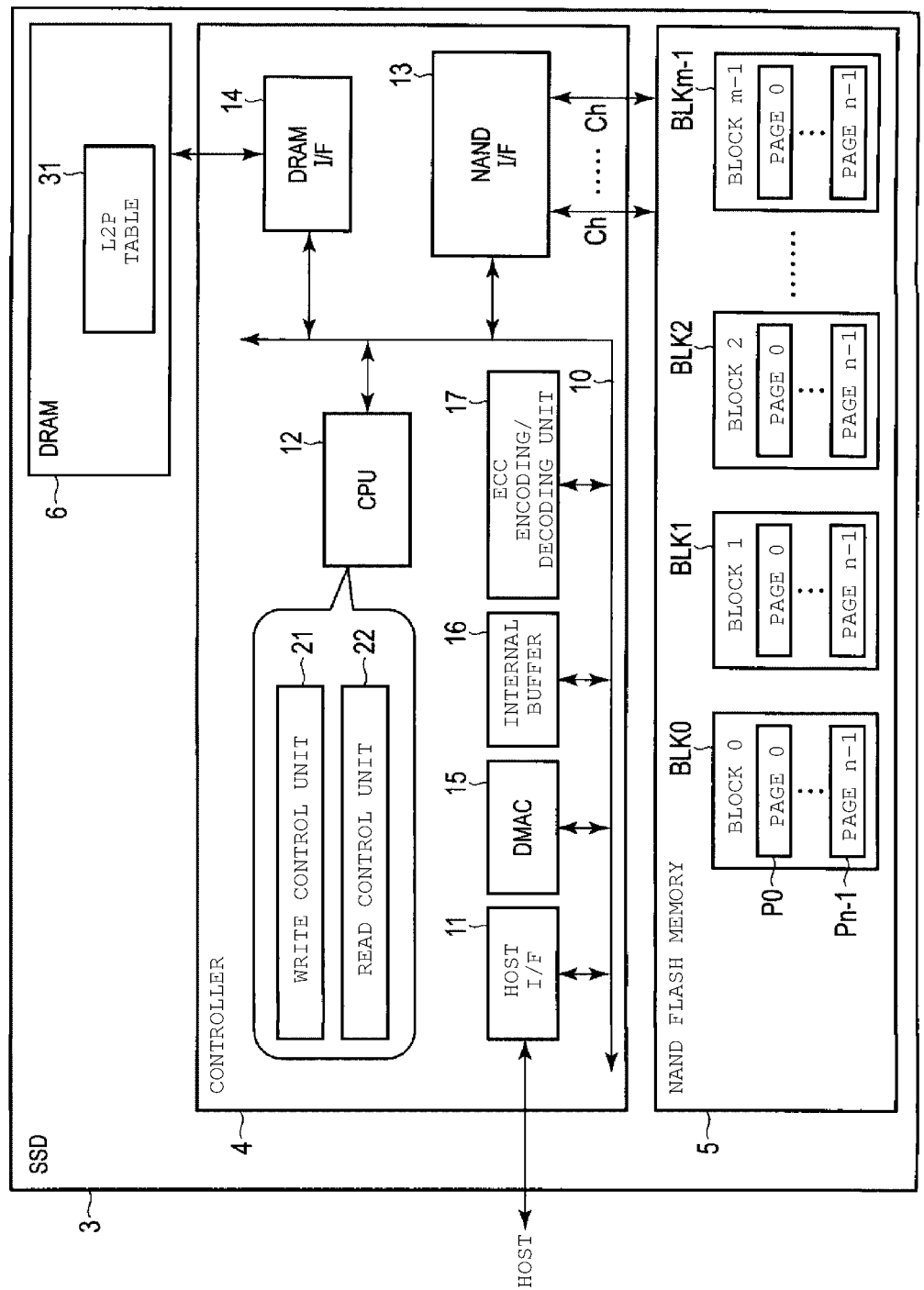
FIG. 3 is a block diagram illustrating a configuration example of the semiconductor storage device.

FIG. 3 illustrates a configuration example of the SSD 3.

The SSD 3 includes a controller 4 and a nonvolatile memory (NAND flash memory) 5. The SSD 3 may include a random access memory such as a DRAM 6.

The NAND flash memory 5 includes a memory cell array that includes a plurality of memory cells arranged in a matrix configuration. The NAND flash memory 5 may be a NAND flash memory having a two-dimensional structure or a NAND flash memory having a three-dimensional structure.

The memory cell array of the NAND flash memory 5 includes a plurality of blocks BLK0 to BLKm−1. Each of the blocks BLK0 to BLKm−1 includes a plurality of pages (pages P0 to Pn−1). The blocks BLK0 to BLKm−1 function as a unit of erase. The block may be referred to as an "erase block", a "physical block", or a "physical erase block". The pages P0 to Pn−1 are units of write operation and read operation of data.

The controller 4 is electrically connected to the NAND flash memory 5, which is the nonvolatile memory, through a NAND interface 13 such as a Toggle NAND flash interface or an Open NAND Flash Interface (ONFI). The controller 4 operates as a memory controller configured to control the NAND flash memory 5. The controller 4 may be implemented by a circuit such as system-on-a-chip (SoC).

In a case where the SSD 3 is configured to operate using the first address designation method, the controller 4 may function as a flash translation layer (FTL) configured to execute data management and block management of the NAND flash memory 5. The data management executed by the FTL includes: 1) management of mapping information indicating a correspondence relationship between logical addresses and physical addresses of the NAND flash memory 5, 2) a process for hiding constraints (for example, the read/write operation in units of pages and the erasing operation in units of blocks) of the NAND flash memory 5, and the like. The logical address is an address used by the host 2 for designating the address of a position in a logical address space of the SSD 3. A logical block address (addressing) (LBA) may be used as the logical address.

Mapping between the logical addresses used by the host 2 for accessing the SSD 3 and the physical addresses of the NAND flash memory 5 is managed using an address conversion table (also referred to as a logical and physical address conversion table or an L2P table 31). Using the L2P table 31, the controller 4 manages mapping between the logical addresses and the physical addresses in units of a predetermined management size. A physical address corresponding to a certain logical address indicates the most recent physical storage position at which data corresponding to the logical address is written in the NAND flash memory 5. The L2P table 31 may be loaded into the DRAM 6 from the NAND flash memory 5 when the SSD 3 is powered ON.

In the NAND flash memory 5, data write to the page can be performed only once per erase cycle. That is, an area in which data is already written in the block cannot be directly overwritten with new data. Thus, when the data already written is updated, the controller 4 writes new data into a non-write area in the block (or a different block) and handles the previous data as invalid data. In other words, the controller 4 does not write update data corresponding to a certain logical address at a physical storage position at which the previous data corresponding to the logical address is stored, and writes the update data at a different physical storage position. The controller 4 associates the logical address with the different physical storage position and invalidates the previous data by updating the L2P table 31.

The block management includes management of a defective block (bad block), wear leveling, garbage collection (also referred to as GC or compaction), and the like. The wear leveling is an operation for uniformizing the number of rewrites (the number of program/erase cycles) to each of the different block.

In a case where the SSD 3 is configured to operate using the second address designation method or the third address designation method, the function of managing the mapping between the logical addresses and the physical addresses of the NAND flash memory 5 using the L2P table 31 is moved to the host 2 side among the functions executed by the FTL.

The controller 4 includes a host interface 11, a CPU 12, a NAND interface 13, a DRAM interface 14, a direct memory access controller (DMAC) 15, an internal buffer 16, an ECC encoding/decoding unit 17, and the like. The host interface 11, the CPU 12, the NAND interface 13, the DRAM interface 14, the direct memory access controller (DMAC) 15, the internal buffer 16, and the ECC encoding/decoding unit 17 are connected to each other through a bus 10.

The host interface 11 is a host interface circuit configured to execute communication with the host 2. For example, the host interface 11 may be a PCIe controller (NVMe controller). Alternatively, in a configuration in which the SSD 3 is connected to the host 2 through Ethernet®, the host interface 11 may be an NVMe over Fabrics (NVMeOF) controller.

The host interface 11 receives various requests (commands) from the host 2. The commands include a write command, a read command, a deallocation (unmap/trim) command, and other various commands.

The CPU 12 is a processor configured to control the host interface 11, the NAND interface 13, and the DRAM interface 14. In response to powering ON of the SSD 3, the CPU 12 performs various processes by loading a control program (e.g., firmware) into the DRAM 6 from the NAND flash memory 5 or a ROM, not illustrated, and executing the control program/firmware. The control program/firmware may be loaded into an SRAM, not illustrated, in the controller 4. The CPU 12 can execute a command process and the like for processing various commands from the host 2. The operation of the CPU 12 is controlled by the firmware. A part or the whole of the command process may be executed by hardware in the controller 4.

The CPU 12 can function as a write control unit 21 and a read control unit 22. A part or the whole of each of the write control unit 21 and the read control unit 22 may be implemented by hardware in the controller 4.

In accordance with a write request (write command) received from the host 2, the write control unit 21 executes a process for writing write data associated with the write request into the NAND flash memory 5. From the NAND flash memory 5, the read control unit 22 reads data designated by a read request (read command) received from the host 2.

The NAND interface 13 is a memory control circuit configured to control the NAND flash memory 5 under control of the CPU 12.

The DRAM interface 14 is a DRAM control circuit configured to control the DRAM 6 under control of the CPU 12. Apart of the storage area of the DRAM 6 may be used as a storage area for the L2P table 31.

In a case where the SSD 3 is configured to operate using the second address designation method or the third address designation method, the controller 4 does not need to manage the L2P table 31. Instead, the host 2 executes the host flash translation layer (FTL) and manages the logical and physical address conversion table managing the mapping between the logical addresses and the physical addresses of the nonvolatile memory.

The DMAC 15 executes data transfer between the memory of the host 2 and the internal buffer 16 under control of the CPU 12. The ECC encoding/decoding unit 17 adds an error correction code (ECC) as a redundant code to data by encoding (ECC encoding) the data to be written when the data is written into the NAND flash memory 5. When data is read from the NAND flash memory 5, the ECC encoding/decoding unit 17 corrects errors in the data using the ECC added to the data (ECC decoding).

Figure 4:
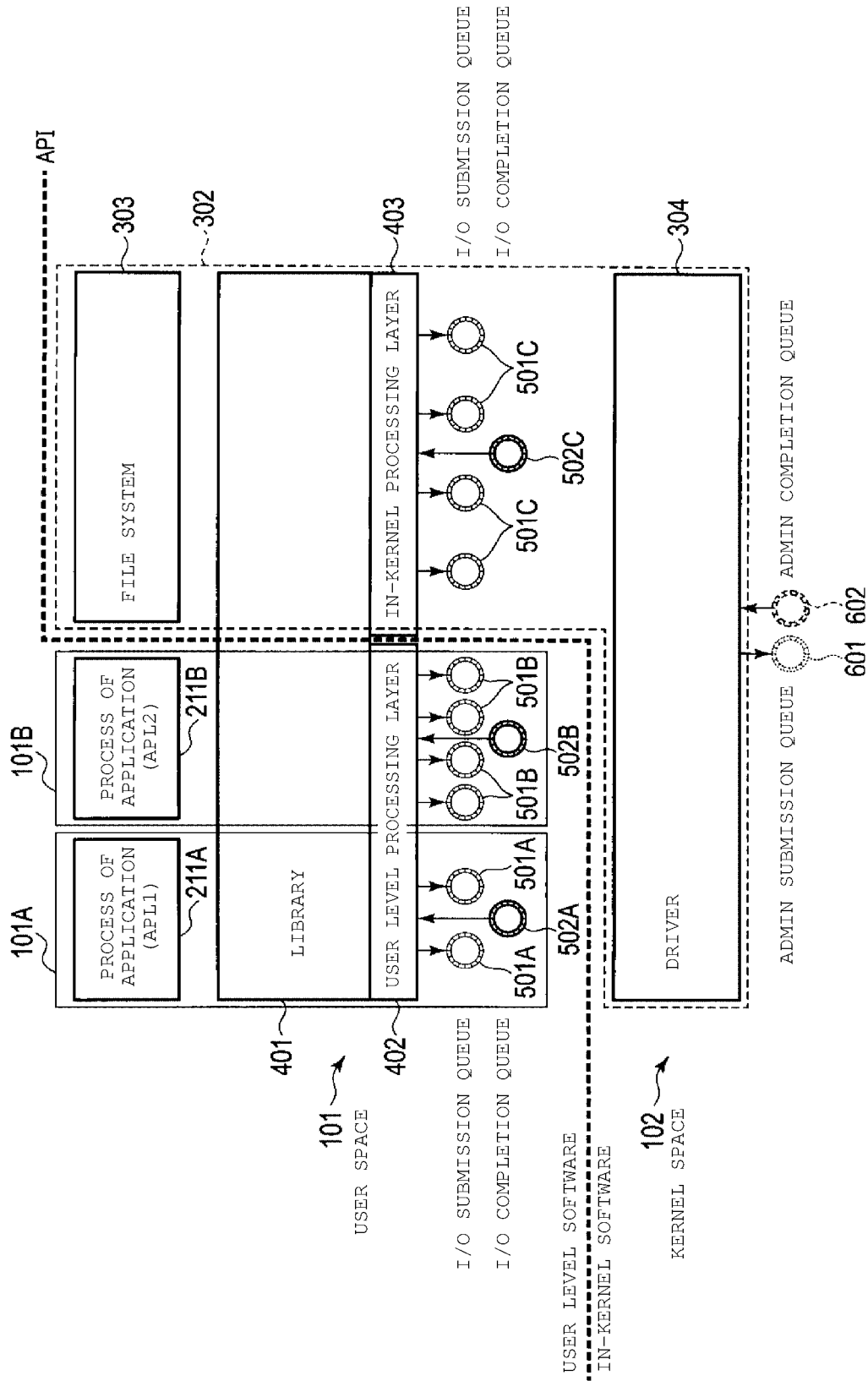
FIG. 4 is a block diagram illustrating an example of a queue management structure for allocating an I/O submission queue dedicated to each application program executed in the information processing apparatus according to the first embodiment.

FIG. 4 illustrates a queue management structure for allocating an I/O submission queue dedicated to each application program.

In FIG. 4, a case where the application program (APL1) 201A and the application program (APL2) 201B are loaded and executed in the main memory 42 is assumed. A memory space 101A and a memory space 101B in the main memory 42 are allocated to the application program (APL1) 201A and the application program (APL2) 201B, respectively.

In the memory space 101A allocated to the application program (APL1) 201A, a process 211A of the application program (APL1) 201A is executed.

An I/O submission queue 501A and an I/O completion queue 502A dedicated to the application program (APL1) 201A are allocated in the memory space 101A by the processor 41.

The process 211A of the application program (APL1) 201A can directly store the write/read request in the I/O submission queue 501A without calling the driver 304 of the kernel 302 using a system call. In addition, from the I/O completion queue 502A, the process 211A of the application program (APL1) 201A can directly acquire the completion response from the SSD 3.

Only one I/O submission queue 501A may be allocated in the memory space 101A of the application program (APL1) 201A. Alternatively, a plurality of I/O submission queues 501A may be allocated in the memory space 101A. Generally, processing of the I/O completion queue does not take time. Thus, even in a case where the plurality of I/O submission queues 501A are allocated in the memory space 101A, allocation of only one I/O completion queue 502A is enough in the memory space 101A.

The I/O submission queue 501A is used for storing the write/read request from the application program (APL1) 201A. The process 211A of the application program (APL1) 201A may directly store the write/read request in the I/O submission queue 501A or may store the write/read request in the I/O submission queue 501A through a library 401.

The I/O completion queue 502A is used for receiving, from the SSD 3, the completion response to the write/read request fetched from the I/O submission queue 501A. The process 211A of the application program (APL1) 201A may directly acquire the completion response from the I/O completion queue 502A or may acquire the completion response from the I/O completion queue 502A through the library 401.

In the memory space 101B allocated to the application program (APL2) 201B, a process 211B of the application program (APL2) 201B is executed. An I/O submission queue 501B and an I/O completion queue 502B dedicated to the application program (APL2) 201B are allocated in the memory space 101B by the processor 41.

The process 211B of the application program (APL2) 201B can directly store the write/read request in the I/O submission queue 501B without calling the driver 304 of the kernel 302 using a system call. In addition, from the I/O completion queue 502B, the process 211B of the application program (APL2) 201B can directly acquire the completion response from the SSD 3.

Only one I/O submission queue 501B may be allocated in the memory space 101B of the application program (APL2) 201B. Alternatively, a plurality of I/O submission queues 501B may be allocated in the memory space 101B. Even in a case where the plurality of I/O submission queues 501B are allocated in the memory space 101B, allocation of only one I/O completion queue 502B is enough in the memory space 101B.

The I/O submission queue 501B is used for storing the write/read request from the application program (APL2) 201B. The process 211B of the application program (APL2) 201B may directly store the write/read request in the I/O submission queue 501B or may store the write/read request in the I/O submission queue 501B through the library 401.

The I/O completion queue 502B is used for receiving, from the SSD 3, the completion response to the write/read request fetched from the I/O submission queue 501B. The process 211B of the application program (APL2) 201B may directly acquire the completion response from the I/O completion queue 502B or may acquire the completion response from the I/O completion queue 502B through the library 401.

In the first embodiment, the I/O submission queue 501A dedicated to the application program (APL1) 201A is allocated in the memory space 101A of the application program (APL1) 201A. In addition, the I/O submission queue 501B dedicated to the application program (APL2) 201B is allocated in the memory space 101B of the application program (APL2) 201B.

Accordingly, a collision in which the application program (APL1) 201A and the application program (APL2) 201B sharing the SSD 3 access the same area in the same I/O queue allocated in the user space 101 at the same time can be avoided. The write/read request or the completion response can be correctly transferred between the host 2 and the SSD 3.

In the first embodiment, an I/O submission queue 501C and an I/O completion queue 502C for the in-kernel module, such as the file system 303, is also present in addition to the I/O queues for the application program (APL1) 201A and the I/O queues for the application program (APL2) 201B.

The in-kernel module is a software module operating in the kernel space 102. The I/O queues (that is, the I/O submission queue 501C and the I/O completion queue 502C) for the in-kernel module are allocated in the kernel space 102 by the processor 41. That is, the processor 41 allocates the I/O submission queue 501C in the kernel space 102 in the main memory 42 and stores the write/read request from the in-kernel module in the I/O submission queue 501C.

The in-kernel module such as the file system 303 may directly store the write/read request in the I/O submission queue 501C or may store the write/read request in the I/O submission queue 501C through the library 401. The processor 41 stores the write/read request from the in-kernel module in the I/O submission queue 501C.

The in-kernel module such as the file system 303 may directly acquire the completion response from the I/O completion queue 502C or may acquire the completion response from the I/O completion queue 502C through the library 401.

The I/O submission queue 501C and the I/O completion queue 502C are used by the in-kernel module such as the file system 303. Accordingly, when an application program using the file system 303 operates in the user space 101, the application program can store the write/read request in the I/O submission queue 501C and cause the write/read request to be fetched by the SSD 3 by calling the file system 303 using a system call.

When the library 401 is used by each of the application programs 201A and 201B and each in-kernel module for accessing the I/O queue, the library 401 manages all I/O queues. The library 401 includes a set of functions for operating each I/O queue. By using the library 401, each of the application programs 201A and 201B and each in-kernel module can easily execute a process of storing the write/read request in the I/O submission queue or a process of acquiring the completion response from the I/O completion queue using a function call of calling a desired function in the library 401.

The library 401 is implemented as a shared library that is shared by multiple programs. The library 401 can operate in both the user space 101 and the kernel space 102. That is, the library 401 can operate in the user space 101 and can also operate in the kernel space 102. Thus, each of the application programs 201A and 201B and each in-kernel module can operate an I/O queue by simply calling a desired function in the library 401. A procedure of calling the library 401 from the application programs 201A and 201B is the same as a procedure of calling the library 401 from the in-kernel module. Accordingly, by using the same coding for calling the library 401, the development work for the application programs 201A and 201B to access the I/O queues by using the library 401 function call(s) and the development work for the in-kernel module requesting to access the I/O queues using the library 401 function call(s) can be performed more simply. The efficiency of the associated development work can be increased.

That is, by executing the library 401, the processor 41 executes an operation of storing the write/read request from the application program 201A in the I/O submission queue 501A. Similarly, by executing the library 401, the processor 41 also executes an operation of storing the write/read request from the application program 201B in the I/O submission queue 501B. Furthermore, by executing the library 401, the processor 41 also executes an operation of storing the write/read request from the in-kernel module in the I/O submission queue 501C.

In order to enable the library 401 to access the I/O queues, a process of mapping the memory area of the I/O queue to the memory space in which the library 401 operates may need to be performed before the access of the library 401 to the I/O queues. In addition, a process for enabling the library 401 to receive a notification indicating that the completion response has been written into the I/O completion queue may need to be performed.

Furthermore, a part of the content of process may vary between a case where the library 401 operates in the kernel space 102 and a case where the library 401 operates in the user space 101.

In a case where the library 401 operates in the kernel space 102, the library 401 can directly operate memory mapping. In addition, the library 401 can operate the memory mapping by calling a function for operating the memory mapping. Furthermore, using interruption, the library 401 can receive the notification indicating that the completion response is written into the I/O completion queue.

In a case where the library 401 operates in the user space 101, the library 401 generally performs the process using a dedicated interface. For example, in Linux®, a dedicated interface called VFIO (see, e.g., https://www.kernel.org/doc/Documentation/vfio.txt) is used for enabling access to the I/O queue(s) in the user space.

In order to be capable of handling the difference in process content between the kernel space 102 and the user space 101, the library 401 may include a user level processing layer 402 and an in-kernel processing layer 403 as a lower layer. The user level processing layer 402 is a code group for executing a unique process necessary for operating the I/O queue in the user space 101 (that is, the I/O queue allocated in the user space). The in-kernel processing layer 403 is a code group for executing a unique process necessary for operating the I/O queue in the kernel space 102 (that is, the I/O queue allocated in the kernel space). The library 401 selects the user level processing layer 402 or the in-kernel processing layer 403 based on the attribute of the space in which the library 401 operates (that is, the user space 101 or the kernel space 102), and operates using the selected processing layer. That is, in a case where the library 401 operates in the user space 101, the library 401 operates using the user level processing layer 402. In a case where the library 401 operates in the kernel space 102, the library 401 operates using the in-kernel processing layer 403.

In the first embodiment, admin queues (admin submission queue 601 and admin completion queue 602) are managed by the driver 304 in the kernel 302.

The admin submission queue 601 is used for issuing each of various management requests (admin commands) for management of the SSD 3 to the SSD 3. The admin completion queue 602 is used for receiving a completion response to each management request from the SSD 3. The processor 41 stores various management requests for management of the SSD 3 in the admin submission queue 601 managed by the driver 304.

Without having direct access to an admin queue, the application program (APL1) 201A and the application program (APL2) 201B must call the kernel 302 using a system call for requesting desired management of the SSD 3, thereby requesting the kernel 302 to store a management request for desired management operation of the SSD 3 (that is, a desired admin command) in the admin submission queue 601.

In the first embodiment, each admin queue is managed by the driver 304 in the kernel 302, and the individual I/O queues to which the application program (APL1) 201A and the application program (APL2) 201B can obtain direct access are allocated in the user space 101.

Accordingly, a collision in which the application programs access the same area in the same I/O queue allocated in the user space 101 at the same time can be avoided while the application program (APL1) 201A and the application program (APL2) 201B sharing the SSD 3 are permitted to have direct access to the corresponding I/O queues from the user space 101. Furthermore, the admin queues are not allocated in the user space 101. The admin queues are allocated in the kernel space 102 and are managed by the driver 304 in the kernel 302. Accordingly, the kernel 302 can determine whether or not the content of management requested from each of the application program (APL1) 201A and the application program (APL2) 201B is a management type permitted for the particular application. Furthermore, the kernel 302 can permit or prohibit the execution of management function based on the determination result.

Figure 5:
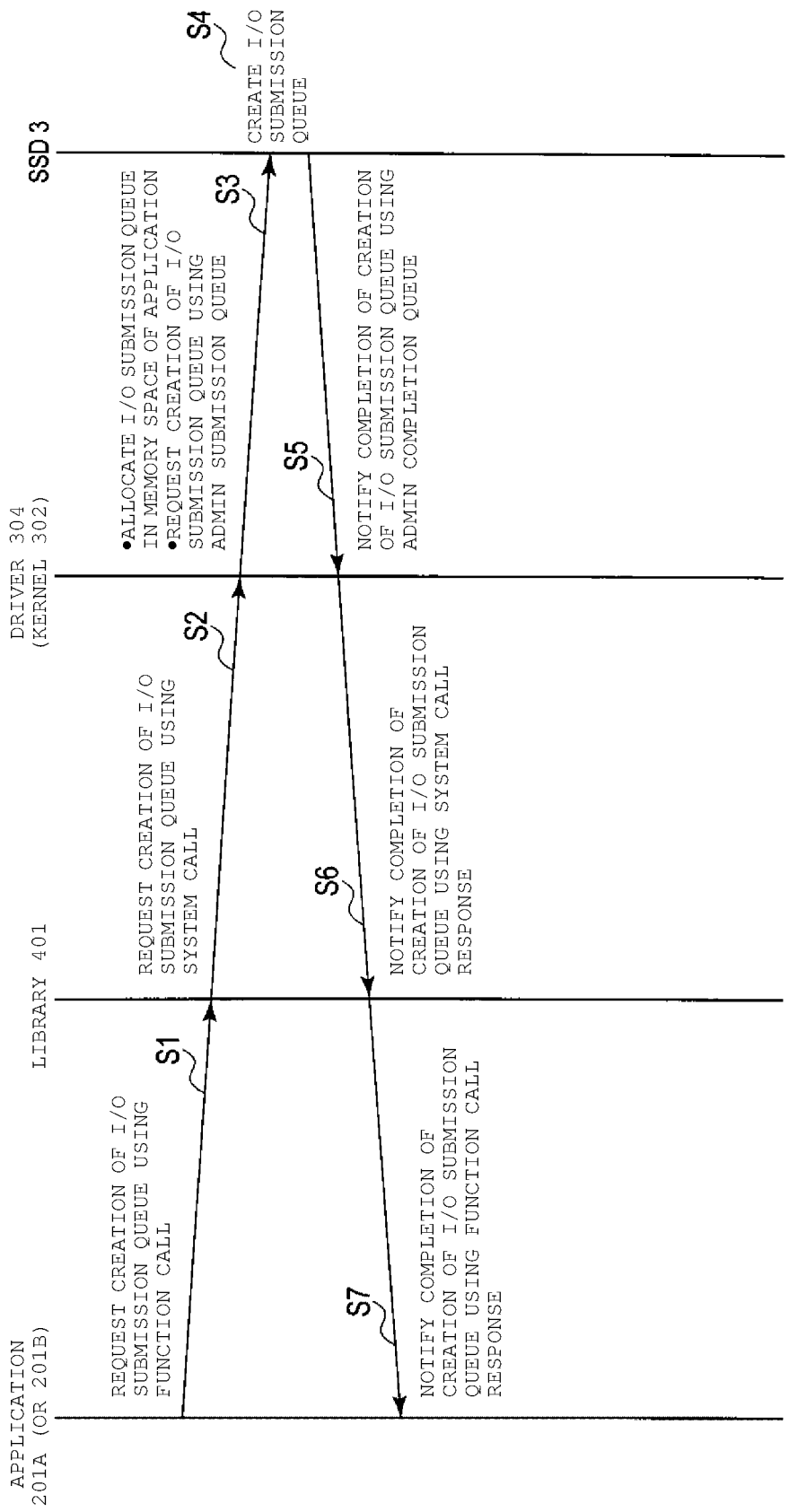
FIG. 5 is a sequence chart illustrating an I/O submission queue creation operation executed in the information processing apparatus according to the first embodiment.

FIG. 5 is a sequence chart illustrating an I/O queue creation operation executed in the host 2. An I/O submission queue creation operation and an I/O completion queue creation operation can be executed using the same procedure. Thus, the I/O submission queue creation operation will be described here.

The application program 201A (or 201B) calls the library 401 using a function call for requesting the creation of the I/O submission queue, thereby requesting the library 401 to transmit an I/O submission queue creation request to the kernel 302 (step S1). In response to the function call, the library 401 calls the kernel 302 (for example, the driver 304) using a system call for requesting the creation of the I/O submission queue and requests the kernel 302 to create the I/O submission queue for the application program 201A (or 201B) (step S2).

Based on the request (that is, the I/O submission queue creation request), the kernel 302 executes: 1) an operation of allocating the I/O submission queue in the memory space 101A (or 101B) of the application program 201A (or 201B), and 2) an operation of issuing the I/O submission queue creation request/command to the SSD 3 using the admin submission queue 601 (step S3).

In the operation of allocating the I/O submission queue in the memory space 101A (or 101B), the kernel 302 executes an operation of determining a memory area of the host physical memory to which the I/O submission queue is to be allocated (that is, the base address of a memory area to which the I/O submission queue is to be allocated in the memory space 101A (or 101B) of the main memory 42), and an operation of allocating the I/O submission queue to the determined memory area. The operation of issuing the I/O submission queue creation request/command to the SSD 3 is executed for notifying the SSD 3 of the memory area (or base address) of the host physical memory to which the I/O submission queue is allocated, thereby enabling the SSD 3 to access the memory area of the host physical memory to which the I/O submission queue is allocated.

In the operation of issuing the I/O submission queue creation request/command to the SSD 3, the driver 304 of the kernel 302 executes an operation of storing the I/O submission queue creation request in the admin submission queue 601 and an operation of notifying the SSD 3 that a new management request (also referred to as a new admin command) is stored in the admin submission queue 601 by accessing a doorbell register corresponding to the admin submission queue 601 in the SSD 3.

The SSD 3 fetches the I/O submission queue creation request from the admin submission queue 601 and executes an I/O submission queue creation process (step S4). The I/O submission queue creation request designates an identifier of the I/O submission queue to be created, the size of the I/O submission queue to be created, an identifier of the I/O completion queue with which the I/O submission queue to be created is to be associated, a priority of the I/O submission queue to be created, the memory area of the host physical memory to which the I/O submission queue to be created is allocated, and the like. In step S4, the SSD 3 executes a process of reflecting the identifier of the I/O submission queue, the memory area to which the I/O submission queue is allocated, the priority of the I/O submission queue, and the like on queue management information managed in the SSD 3, a process of enabling the doorbell register corresponding to the I/O submission queue, and the like. The doorbell register corresponding to the I/O submission queue is a register in the SSD 3 and is used for notifying the SSD 3 from the host 2 that a new write/read request is stored in the I/O submission queue.

When the execution of the I/O submission queue creation process is completed, the SSD 3 notifies the host 2 of the completion response indicating the completion of creation of the I/O submission queue by storing the completion response to the I/O submission queue creation request in the admin completion queue 602 (step S5). In step S5, furthermore, the SSD 3 notifies the host 2 that a new completion response is stored in the admin completion queue 602 by generating an interruption signal.

The kernel 302 (for example, the driver 304) acquires the completion response from the admin completion queue 602 and returns the acquired completion response to the library 401 using a system call response, thereby notifying the library 401 of the completion of creation of the I/O submission queue (step S6). In step S6, a value indicating the memory area to which the I/O submission queue is allocated may be returned to the library 401 as a return value. The library 401 returns the completion response received from the kernel 302 to the application program 201A (or 201B) using a function call response, thereby notifying the application program 201A (or 201B) of the completion of creation of the I/O submission queue (step S7). In step S7, the value indicating the memory area to which the I/O submission queue is allocated may be returned to the application program 201A (or 201B) as a return value.

The SSD 3 recognizes the memory area of the host physical memory (main memory 42) to which the I/O submission queue is allocated. Thus, the SSD 3 can fetch the write/read request from the I/O submission queue by having read access to the I/O submission queue.

Figure 6:
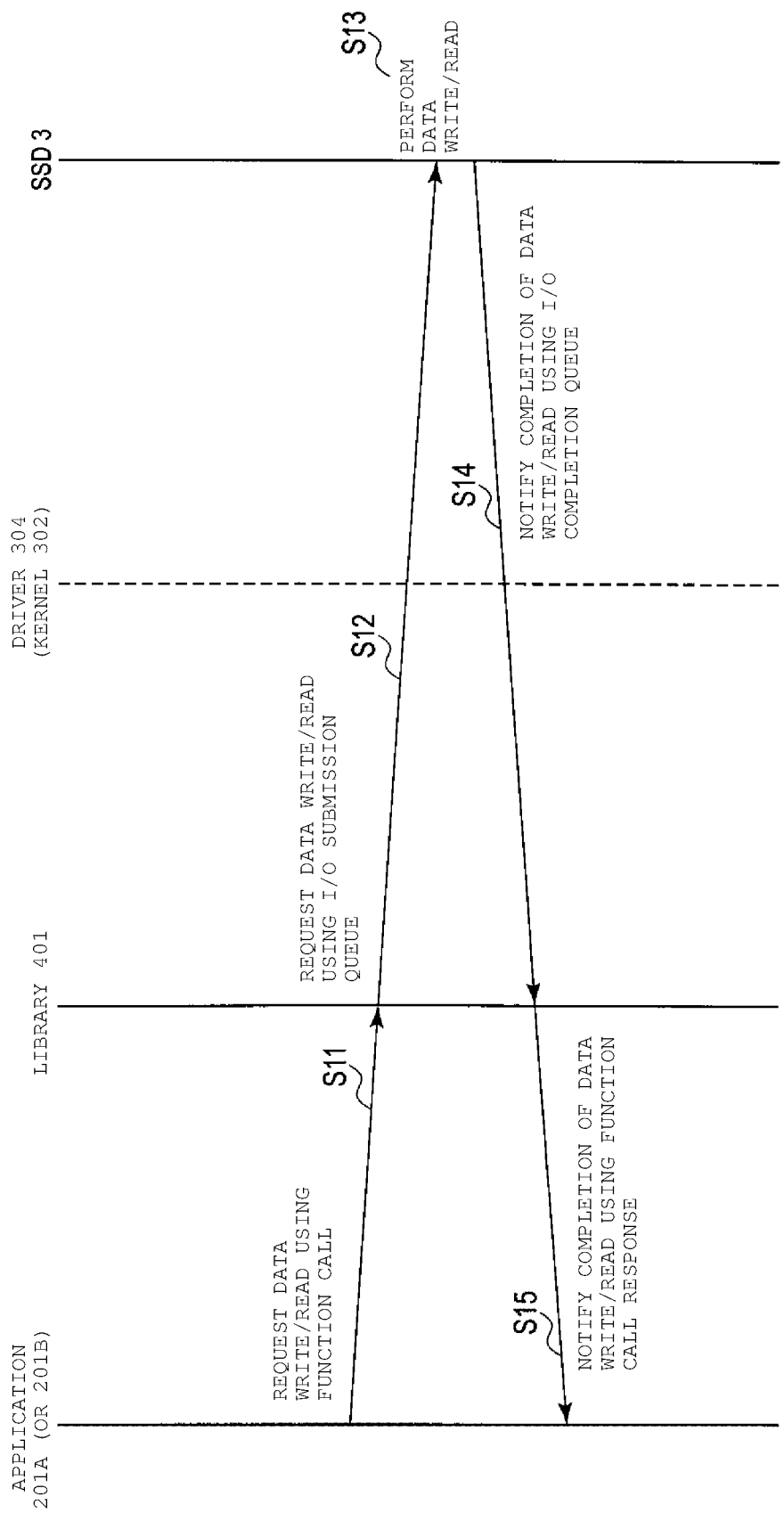
FIG. 6 is a sequence chart illustrating a data write/read operation executed in the information processing apparatus according to the first embodiment.

FIG. 6 is a sequence chart illustrating a data write/read operation executed in the host 2.

The application program 201A (or 201B) calls the library 401 using a function call for storing the write/read request in a specific I/O submission queue, thereby requesting the library 401 to store the write/read request in the I/O submission queue (step S11). In the function call, from the application program 201A (or 201B), the library 401 may be notified of a parameter indicating the identifier of the I/O submission queue dedicated to the application program 201A (or 201B). From the application program 201A (or 201B), the library 401 may also be notified of a parameter indicating the memory area to which the I/O submission queue dedicated to the application program 201A (or 201B) is allocated.

In response to the function call, the library 401 executes a process of issuing the write/read request from the application program 201A (or 201B) to the SSD 3 using the I/O submission queue dedicated to the application program 201A (or 201B) (step S12). In step S12, the library 401 executes (1) an operation of storing the write/read request from the application program 201A (or 201B) in the I/O submission queue dedicated to the application program 201A (or 201B) and (2) an operation of notifying the SSD 3 that a new write/read request is stored in the I/O submission queue by accessing the doorbell register corresponding to the I/O submission queue.

The SSD 3 fetches the write/read request from the I/O submission queue and executes an operation of writing data into the NAND flash memory 5 based on the fetched write/read request or an operation of reading data from the NAND flash memory 5 based on the fetched write/read request (step S13).

When the execution of the data write/read operation is completed, the SSD 3 stores a completion response to the write/read request in the I/O completion queue corresponding to the I/O submission queue from which the write/read request is fetched, thereby notifying the host 2 of the completion of the write/read request (step S14). In step S14, furthermore, the SSD 3 notifies the host 2 that a new completion response is stored in the I/O completion queue by generating an interruption signal.

The library 401 acquires the completion response from the I/O completion queue and returns the acquired completion response to the application program 201A (or 201B) using the function call response, thereby notifying the application program 201A (or 201B) of the completion of the write/read request (step S15).

Figure 7:
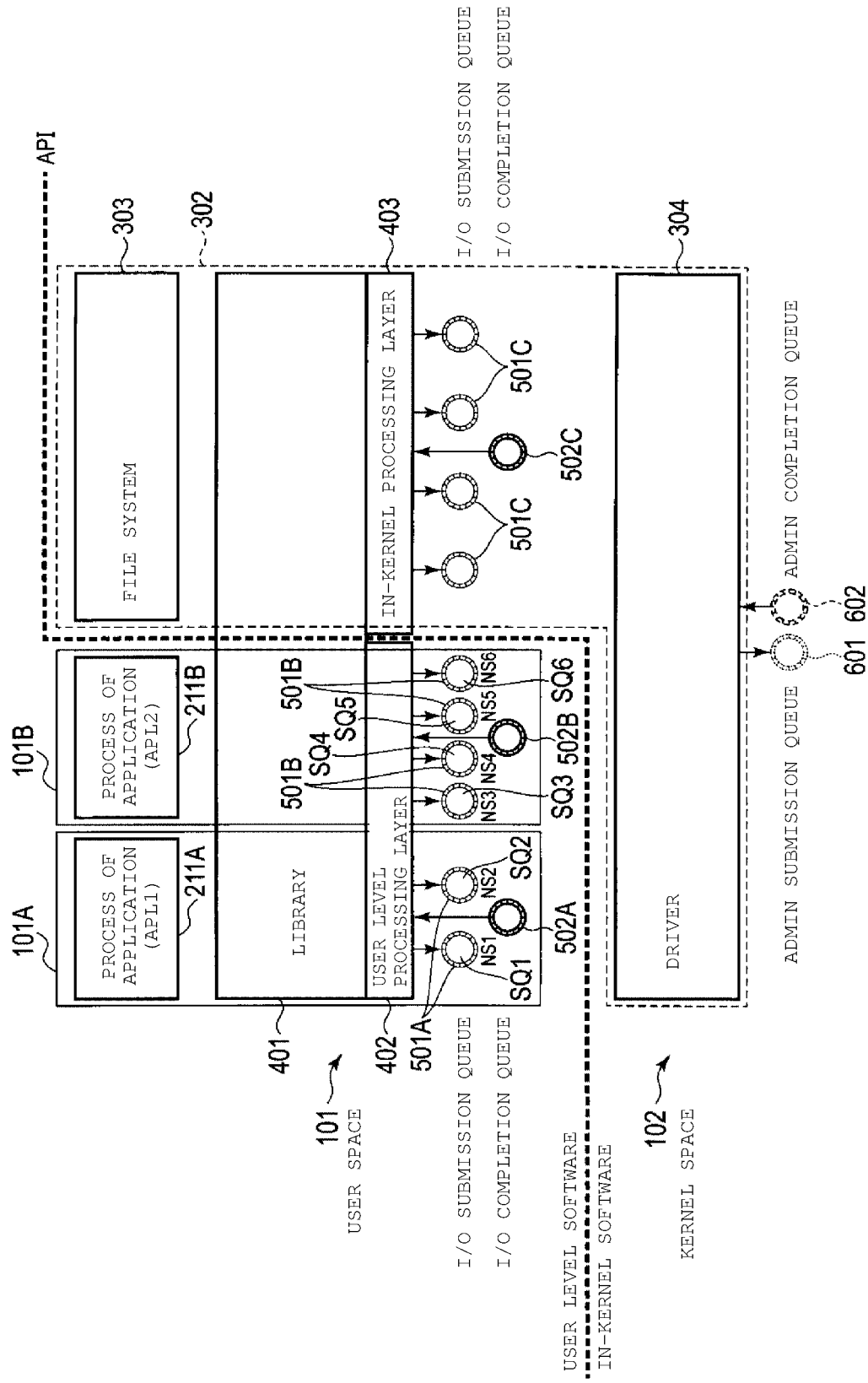
FIG. 7 is a block diagram illustrating an example of a queue management structure for allocating an I/O submission queue dedicated to each of a plurality of namespaces corresponding to each application program.

FIG. 7 illustrates an example of a queue management structure for allocating an I/O submission queue dedicated to each of a plurality of namespaces corresponding to each application program.

The controller 4 of the SSD 3 has a multi-namespace management function of managing a plurality of namespaces obtained by logically dividing the NAND flash memory 5. Each namespace is one type of area (storage area) in the NAND flash memory 5. Each individual namespace is identified by an identifier of the namespace (NSID). An LBA range (LBA0 to LBAn−1) is allocated to each namespace. The size of the LBA range (that is, the number of LBAs) is variable for each namespace. Each LBA range starts from LBA0.

In the first embodiment, the processor 41 can allocate a plurality of I/O submission queues respectively corresponding to a plurality of namespaces accessible from the application program 201A in the memory space 101A of the application program 201A.

In FIG. 7, the I/O submission queue (SQ1) 501A corresponding to a namespace NS1 accessible from the application program 201A and the I/O submission queue (SQ2) 501A corresponding to a namespace NS2 accessible from the application program 201A are allocated in the memory space 101A of the application program 201A.

When the application program 201A needs to perform writing/reading in the namespace NS1, the application program 201A may directly store a write/read request including an identifier (NSID1) of the namespace NS1 in the I/O submission queue (SQ1) 501A or may store a write/read request including the identifier (NSID1) of the namespace NS1 in the I/O submission queue (SQ1) 501A through the library 401.

Similarly, when the application program 201A needs to perform writing/reading in the namespace NS2, the application program 201A may directly store a write/read request including an identifier (NSID2) of the namespace NS2 in the I/O submission queue (SQ2) 501A or may store a write/read request including the identifier (NSID2) of the namespace NS2 in the I/O submission queue (SQ2) 501A through the library 401.

The application program 201A may execute access to the namespace NS1 in parallel with access to the namespace NS2. When one I/O submission queue is shared between the namespace NS1 and the namespace NS2, a delay in I/O processing with respect to one namespace causes a delay in I/O processing with respect to the other namespace. Generally, the I/O submission queue is a circular buffer using a first-in first-out method. Thus, when a new write/read request with respect to the namespace NS2 is stored in the I/O submission queue in a state where a large number of write/read requests with respect to the namespace NS1 are accumulated in the I/O submission queue, the new stored write/read request for the namespace NS2 cannot be fetched unless the fetching of all write/read requests for the namespace NS1 accumulated in the I/O submission queue is completed.

In the first embodiment, the dedicated I/O submission queues SQ1 and SQ2 respectively corresponding to the namespace NS1 and the namespace NS2 accessible by the application program 201A are allocated. Thus, even when a delay in I/O processing with respect to one namespace occurs, a delay in I/O processing with respect to the other namespace can be prevented.

A plurality of I/O submission queues 501B corresponding to a plurality of namespaces accessible from the application program 201B may also be allocated in the memory space 101B of the application program 201B. In FIG. 7, a case where four namespaces NS3 to NS6 accessible from the application program 201B are present, and the I/O submission queue (SQ3) 501B for the namespace NS3, the I/O submission queue (SQ4) 501B for the namespace NS4, the I/O submission queue (SQ5) 501B for the namespace NS5, and the I/O submission queue (SQ6) 501B for the namespace NS6 are allocated in the memory space 101B of the application program 201B is illustrated.

Generally, processing of the I/O completion queue does not take time. Thus, one I/O completion queue is enough for each of the application program (APL1) 201A and the application program (APL2) 201B.

Figure 8:
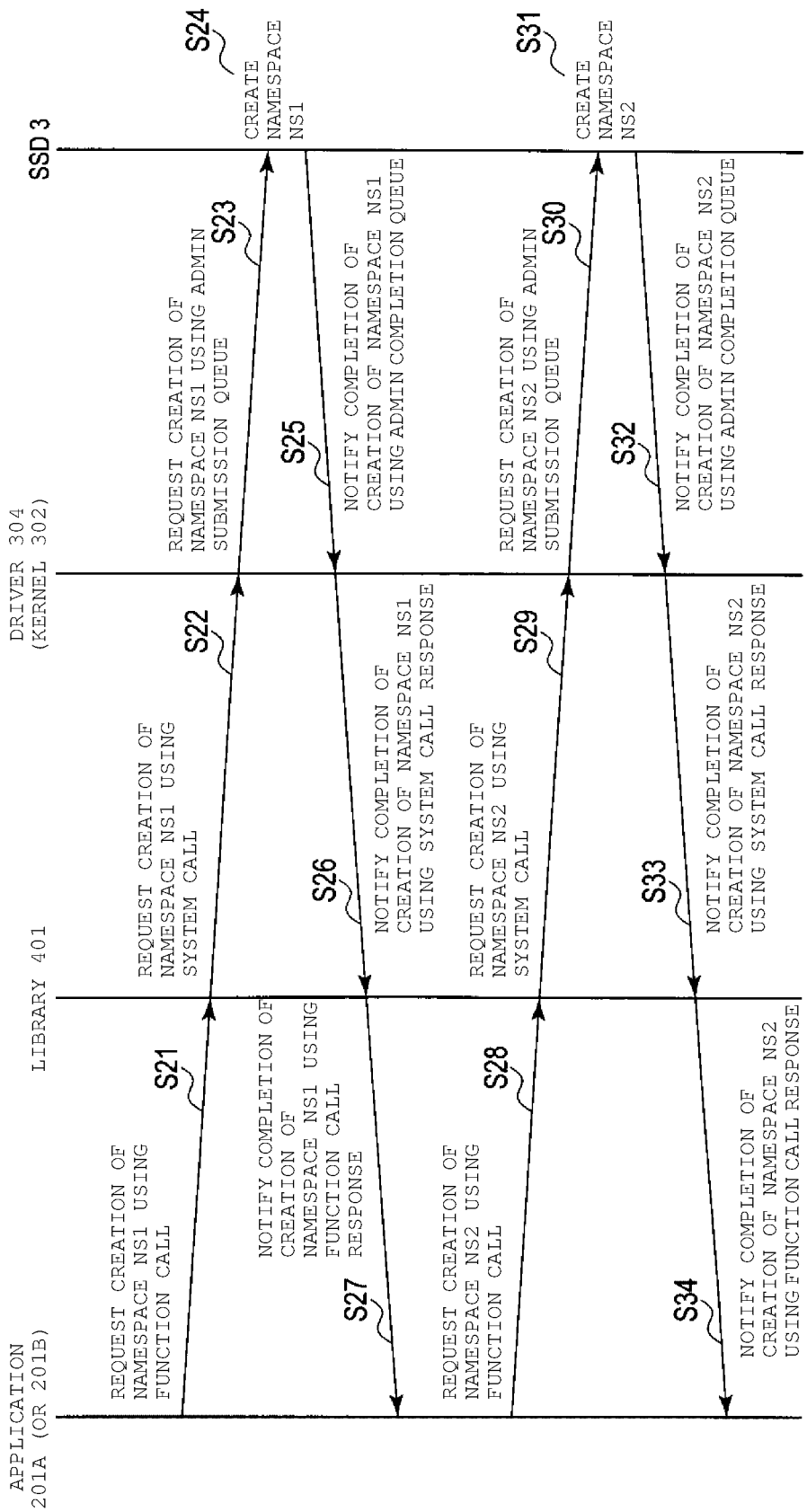
FIG. 8 is a sequence chart illustrating a namespace creation operation executed in the information processing apparatus according to the first embodiment.

FIG. 8 is a sequence chart illustrating a namespace creation operation executed in the host 2.

The application program 201A (or 201B) calls the library 401 using a function call for requesting creation of a certain namespace (here, NS1), thereby requesting the library 401 to transmit a namespace creation request (also referred to as a namespace management command) to the kernel 302 (step S21).

In response to the function call, the library 401 calls the kernel 302 (for example, the driver 304) using a system call for requesting creation of the namespace, thereby requesting the kernel 302 (for example, the driver 304) to transmit the namespace creation request to the SSD 3 (step S22).

The driver 304 of the kernel 302 executes an operation of issuing the namespace creation request to the SSD 3 using the admin submission queue 601 (step S23). In the operation of issuing the namespace creation request to the SSD 3, the driver 304 of the kernel 302 stores the namespace creation request in the admin submission queue 601 and notifies the SSD 3 that a new management request (also referred to as a new admin command) is stored in the admin submission queue 601 by accessing a doorbell register corresponding to the admin submission queue 601 in the SSD 3.

The SSD 3 fetches the namespace creation request from the admin submission queue 601 and executes a namespace creation process (step S24). When the execution of the namespace creation process is completed, the SSD 3 notifies the host 2 of the completion of creation of the namespace by storing a completion response to the namespace creation request in the admin completion queue 602 (step S25). In step S25, the SSD 3 notifies the host 2 that a new completion response is stored in the admin completion queue 602 by generating an interruption signal.

The kernel 302 (for example, the driver 304) acquires the completion response from the admin completion queue 602 and returns the acquired completion response to the library 401 using a system call response, thereby notifying the library 401 of the completion of creation of the namespace (here, NS1) (step S26). The library 401 returns the completion response received from the kernel 302 to the application program 201A (or 201B) using the function call response, thereby notifying the application program 201A (or 201B) of the completion of creation of namespace (here, NS1) (step S27).

The SSD 3 recognizes the identifier (NSID1) of the created namespace (NS1). Thus, when the SSD 3 receives the write/read request including the identifier (NSID1) of the namespace from the host 2, the SSD 3 can access an area corresponding to the namespace (NS1) in the NAND flash memory.

The namespace (NS2) for the application program 201A (or 201B) can also be created using the same procedure as the process of creating the namespace (NS1) for the application program 201A (or 201B) (steps S28 to S34).

Figure 9:
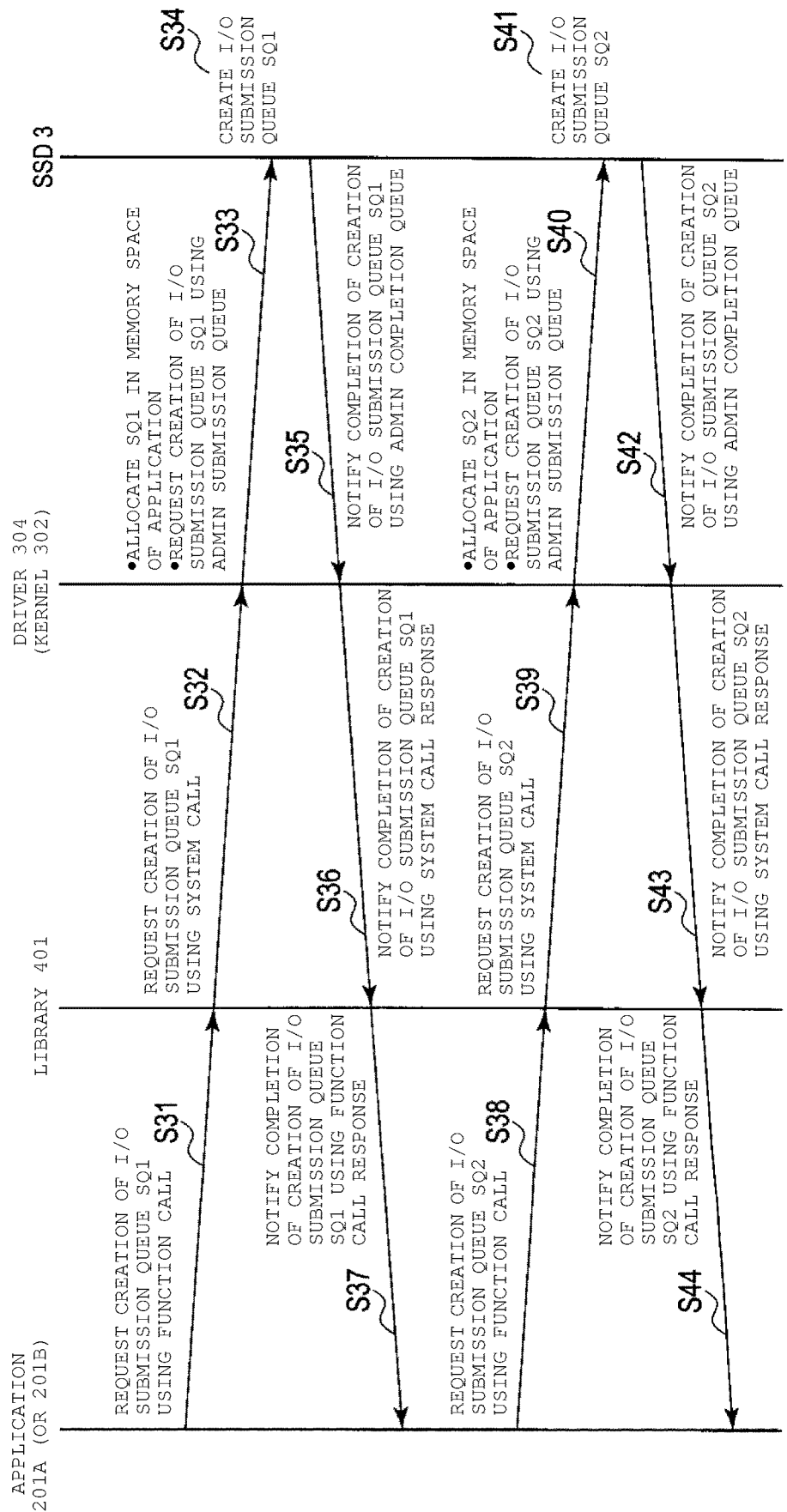
FIG. 9 is a sequence chart illustrating an operation of creating a plurality of I/O submission queues respectively corresponding to a plurality of namespaces used by each application.

FIG. 9 is a sequence chart illustrating an operation of creating a plurality of I/O submission queues respectively corresponding to a plurality of namespaces used by each application.

The creation of the plurality of I/O submission queues respectively corresponding to the plurality of namespaces can be executed by repeating the I/O submission queue creation operation described in FIG. 5 a plurality of times.

In order to create the first I/O submission queue (for example, SQ1), the application program 201A (or 201B) calls the library 401 using a function call for requesting the creation of the I/O submission queue, thereby requesting the library 401 to transmit an I/O submission queue creation request to the kernel 302 (step S31). In response to the function call, the library 401 reads the kernel 302 (for example, the driver 304) using a system call for requesting the creation of the I/O submission queue and requests the kernel 302 to create the I/O submission queue for the application program 201A (or 201B) (step S32).

Based on the request (that is, the I/O submission queue creation request), the kernel 302 executes (1) an operation of allocating the I/O submission queue in the memory space 101A (or 101B) of the application program 201A (or 201B) and (2) an operation of issuing the I/O submission queue creation request to the SSD 3 using the admin submission queue 601 (step S33).

The SSD 3 fetches the I/O submission queue creation request from the admin submission queue 601 and executes the I/O submission queue creation process (step S34).

When the execution of the I/O submission queue creation process is completed, the SSD 3 notifies the host 2 of the completion response indicating the completion of creation of the I/O submission queue by storing the completion response to the I/O submission queue creation request in the admin completion queue 602 (step S35). In step S35, the SSD 3 notifies the host 2 that a new completion response is stored in the admin completion queue 602 by generating an interruption signal.

The kernel 302 (for example, the driver 304) acquires the completion response from the admin completion queue 602 and returns the acquired completion response to the library 401 using a system call response, thereby notifying the library 401 of the completion of creation of the I/O submission queue (step S36). The library 401 returns the completion response received from the kernel 302 to the application program 201A (or 201B) using the function call response, thereby notifying the application program 201A (or 201B) of the completion of creation of the I/O submission queue (step S37).

In order to create the second I/O submission queue (for example, SQ2), the application program 201A (or 201B) calls the library 401 using the function call for requesting the creation of the I/O submission queue, thereby requesting the library 401 to transmit an I/O submission queue creation request to the kernel 302 (step S38). Accordingly, the same processes as the processes described in steps S32 to S37 are executed (steps S39 to S44), and the creation of the second I/O submission queue (for example, SQ2) is completed.

Figure 10:
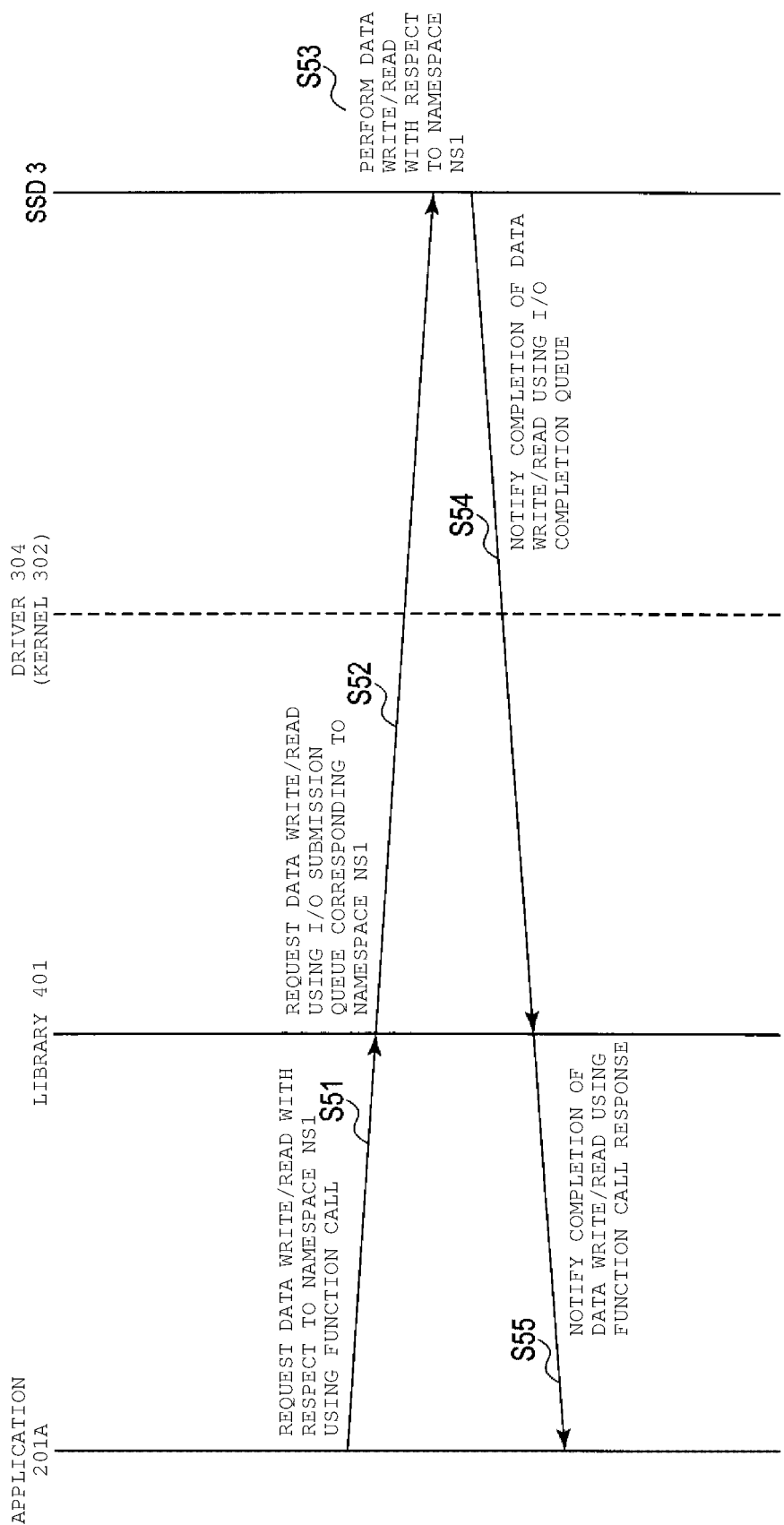
FIG. 10 is a sequence chart illustrating a data write/read operation executed for each namespace in the information processing apparatus according to the first embodiment.

FIG. 10 is a sequence chart illustrating a data write/read operation with respect to each namespace.

A case where the application program 201A writes or reads data with respect to NS1 is assumed.

The application program 201A calls the library 401 using the function call for storing the write/read request including the identifier (NSID1) of NS1 in a specific I/O submission queue (for example, SQ1), thereby requesting the library 401 to store the write/read request in the specific I/O submission queue (for example, SQ1) (step S51).

In response to the function call, the library 401 executes a process of issuing the write/read request including NSID1 to the SSD 3 using the specific I/O submission queue (for example, SQ1) (step S52). In step S52, the library 401 executes (1) an operation of storing the write/read request including NSID1 in the specific I/O submission queue (for example, SQ1) and (2) an operation of notifying the SSD 3 that a new write/read request is stored in the specific I/O submission queue (for example, SQ1) by accessing a doorbell register corresponding to the specific I/O submission queue (for example, SQ1).

The SSD 3 fetches the write/read request including NSID1 from the I/O submission queue and executes an operation of writing data into an area corresponding to NS1 in the NAND flash memory 5 based on the fetched write/read request or an operation of reading data from the area corresponding to NS1 in the NAND flash memory 5 based on the fetched write/read request (step S53).

When the execution of the data write/read operation is completed, the SSD 3 stores a completion response to the write/read request in the I/O completion queue corresponding to the I/O submission queue from which the write/read request is fetched, thereby notifying the host 2 of the completion of the write/read request (step S54). In step S54, the SSD 3 notifies the host 2 that a new completion response is stored in the I/O completion queue by generating an interruption signal.

The library 401 acquires the completion response from the I/O completion queue and returns the acquired completion response to the application program 201A using the function call response, thereby notifying the application program. 201A of the completion of the write/read request (step S55).

Figure 11:
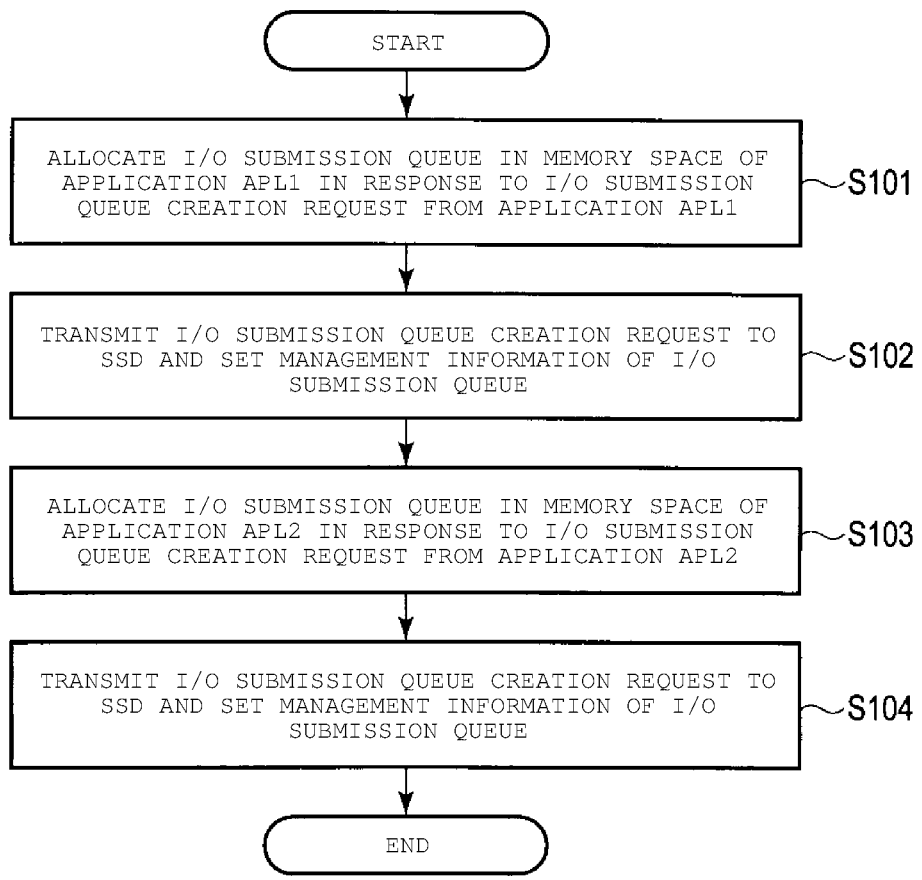
FIG. 11 is a flowchart illustrating a procedure for an I/O submission queue creation operation executed in the information processing apparatus according to the first embodiment.

FIG. 11 is a flowchart illustrating a procedure of I/O submission queue creation operation executed in the host 2.

The processor 41 of the host 2 executes the following process by executing an instruction group corresponding to host software in the main memory 42.

In response to the I/O submission queue creation request from the application program (APL1) 201A, the processor 41 allocates the I/O submission queue in the memory space 101A of the application program (APL1) 201A (step S101).

The processor 41 transmits the I/O submission queue creation request to the SSD 3 (step S102), thereby causing the SSD 3 to execute the I/O submission queue creation process. In the I/O submission queue creation process, the SSD 3 reflects management information of the I/O submission queue (the identifier of the I/O submission queue, the memory area of the I/O submission queue, the priority of the I/O submission queue, and the like) on the queue management information in the SSD 3.

In response to the I/O submission queue creation request from the application program (APL2) 201B, the processor 41 allocates the I/O submission queue in the memory space 101B of the application program (APL2) 201B (step S103).

The processor 41 transmits the I/O submission queue creation request to the SSD 3 (step S104), thereby causing the SSD 3 to execute the I/O submission queue creation process. In the I/O submission queue creation process, the SSD 3 reflects management information of the I/O submission queue (the identifier of the I/O submission queue, the memory area of the I/O submission queue, the priority of the I/O submission queue, and the like) on the queue management information in the SSD 3.

Figure 12:
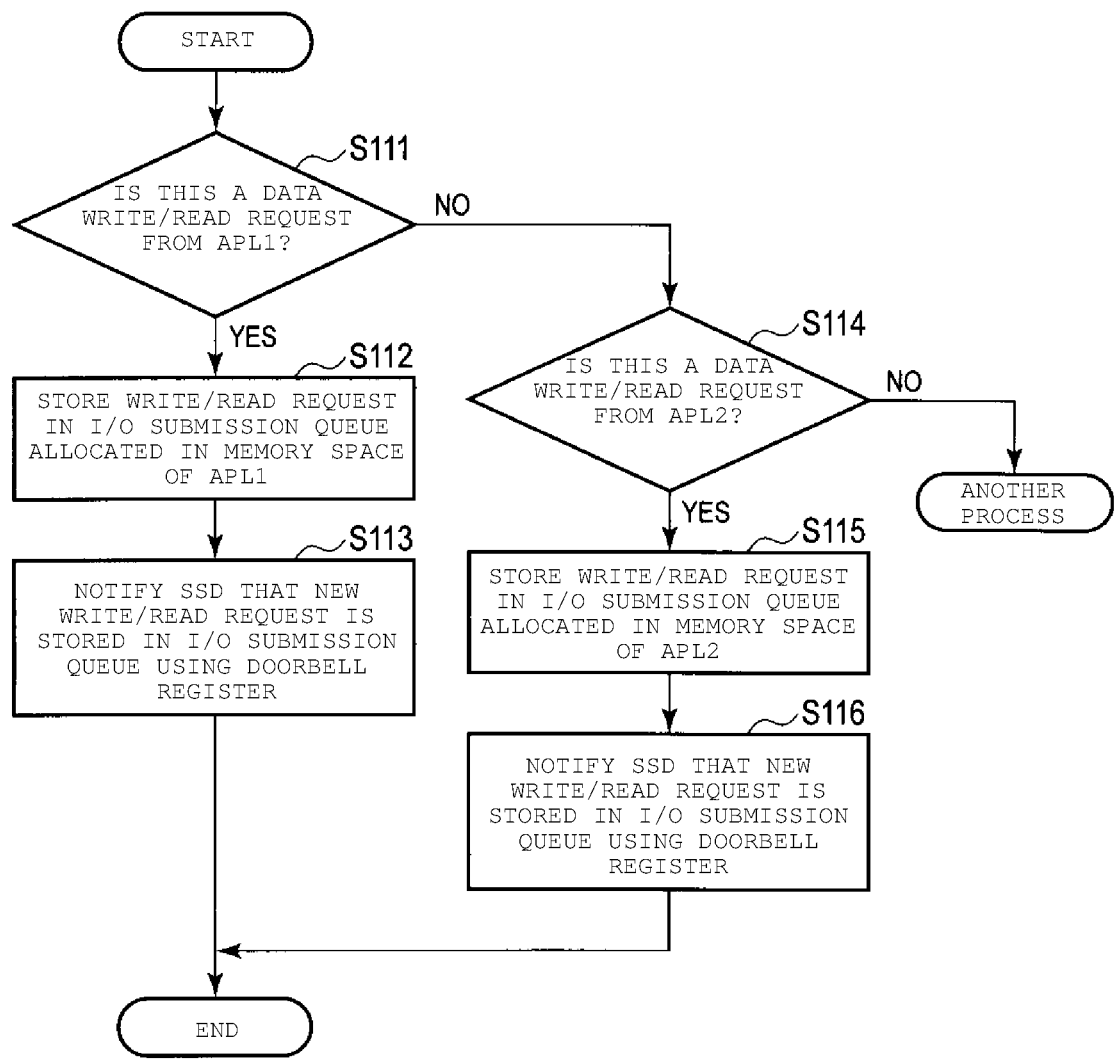
FIG. 12 is a flowchart illustrating a procedure for issuing a write/read request to the semiconductor storage device.

FIG. 12 is a flowchart illustrating a procedure of operation of issuing the write/read request to the SSD 3.

The processor 41 of the host 2 executes the following process by executing the instruction group corresponding to the host software in the main memory 42.

In response to the write/read request from the application program (APL1) 201A (YES in step S111), the processor 41 stores the write/read request in the I/O submission queue 501A allocated in the memory space 101A of the application program (APL1) 201A (steps S112 and S113). In this case, first, the processor 41 stores the write/read request from the application program (APL1) 201A in the I/O submission queue 501A (step S112). The processor 41 notifies the SSD 3 that a new write/read request is stored in the I/O submission queue 501A by accessing a doorbell register corresponding to the I/O submission queue 501A in the SSD 3 (step S113).

Similarly, in response to the write/read request from the application program (APL2) 201B (YES in step S114), the processor 41 stores the write/read request in the I/O submission queue 501B allocated in the memory space 101B of the application program (APL2) 201B (steps S115 and S116). In this case, first, the processor 41 stores the write/read request from the application program (APL2) 201B in the I/O submission queue 501B (step S115). The processor 41 notifies the SSD 3 that a new write/read request is stored in the I/O submission queue 501B by accessing a doorbell register corresponding to the I/O submission queue 501B in the SSD 3 (step S116).

Figure 13:
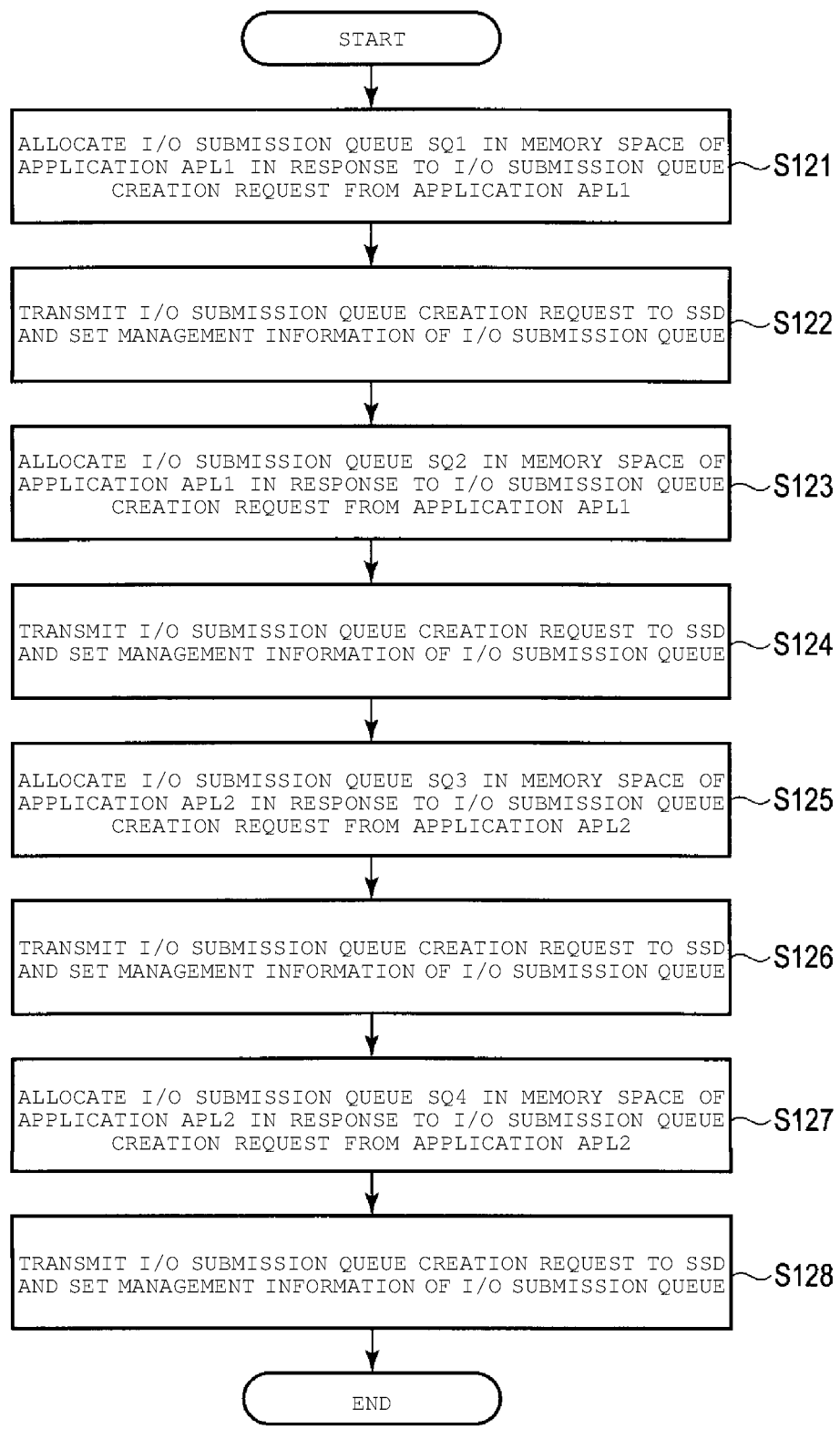
FIG. 13 is a flowchart illustrating a procedure for creating the plurality of I/O submission queues respectively corresponding to the namespaces used by each application.

FIG. 13 is a flowchart illustrating a procedure of operation of creating a plurality of I/O submission queues respectively corresponding to a plurality of namespaces used by each application.

When the application program (APL1) 201A desires to accessing a plurality of namespaces in parallel, the application program (APL1) 201A issues the I/O submission queue creation request a plurality of times in order to create a plurality of I/O submission queues dedicated to the application program (APL1) 201A.

Hereinafter, a case where two I/O submission queues dedicated to the application program (APL1) 201A are created will be assumed.

The processor 41 of the host 2 executes the following process by executing the instruction group corresponding to the host software in the main memory 42.

In response to the first I/O submission queue creation request from the application program (APL1) 201A, the processor 41 allocates the I/O submission queue (for example, SQ1) in the memory space 101A of the application program (APL1) 201A (step S121).

The processor 41 transmits the I/O submission queue creation request to the SSD 3 (step S122), thereby causing the SSD 3 to execute the I/O submission queue creation process. In the I/O submission queue creation process, the SSD 3 reflects management information of the I/O submission queue (for example, SQ1) (the identifier of the I/O submission queue, the memory area of the I/O submission queue, the priority of the I/O submission queue, and the like) on the queue management information in the SSD 3.

In response to the second I/O submission queue creation request from the application program (APL1) 201A, the processor 41 allocates the I/O submission queue (for example, SQ2) in the memory space 101A of the application program (APL1) 201A (step S123).

The processor 41 transmits the I/O submission queue creation request to the SSD 3 (step S123), thereby causing the SSD 3 to execute the I/O submission queue creation process. In the I/O submission queue creation process, the SSD 3 reflects management information of the I/O submission queue (for example, SQ2) (the identifier of the I/O submission queue, the memory area of the I/O submission queue, the priority of the I/O submission queue, and the like) on the queue management information in the SSD 3.

When the application program (APL2) 201B desires to access a plurality of namespaces in parallel, the application program (APL2) 201B issues the I/O submission queue creation request a plurality of times in order to create a plurality of I/O submission queues dedicated to the application program (APL2) 201B.

Hereinafter, a case where two I/O submission queues dedicated to the application program (APL2) 201B are created will be assumed.

In response to the first I/O submission queue creation request from the application program (APL2) 201B, the processor 41 allocates the I/O submission queue (for example, SQ3) in the memory space 101B of the application program (APL2) 201B (step S125).

The processor 41 transmits the I/O submission queue creation request to the SSD 3 (step S126), thereby causing the SSD 3 to execute the I/O submission queue creation process. In the I/O submission queue creation process, the SSD 3 reflects management information of the I/O submission queue (for example, SQ3) (the identifier of the I/O submission queue, the memory area of the I/O submission queue, the priority of the I/O submission queue, and the like) on the queue management information in the SSD 3.

In response to the second I/O submission queue creation request from the application program (APL2) 201B, the processor 41 allocates the I/O submission queue (for example, SQ4) in the memory space 101B of the application program (APL2) 201B (step S127).

The processor 41 transmits the I/O submission queue creation request to the SSD 3 (step S128), thereby causing the SSD 3 to execute the I/O submission queue creation process. In the I/O submission queue creation process, the SSD 3 reflects management information of the I/O submission queue (for example, SQ4) (the identifier of the I/O submission queue, the memory area of the I/O submission queue, the priority of the I/O submission queue, and the like) on the queue management information in the SSD 3.

Generally, the number of namespaces that need to be accessed in parallel varies for each application program. In the first embodiment, the I/O submission queue dedicated to the application program is created in response to the I/O submission queue creation request from the application program. Accordingly, the same number of dedicated I/O submission queues as the number of namespaces that need to be accessed in parallel by each individual application program can be created for each individual application program.

Figure 14:
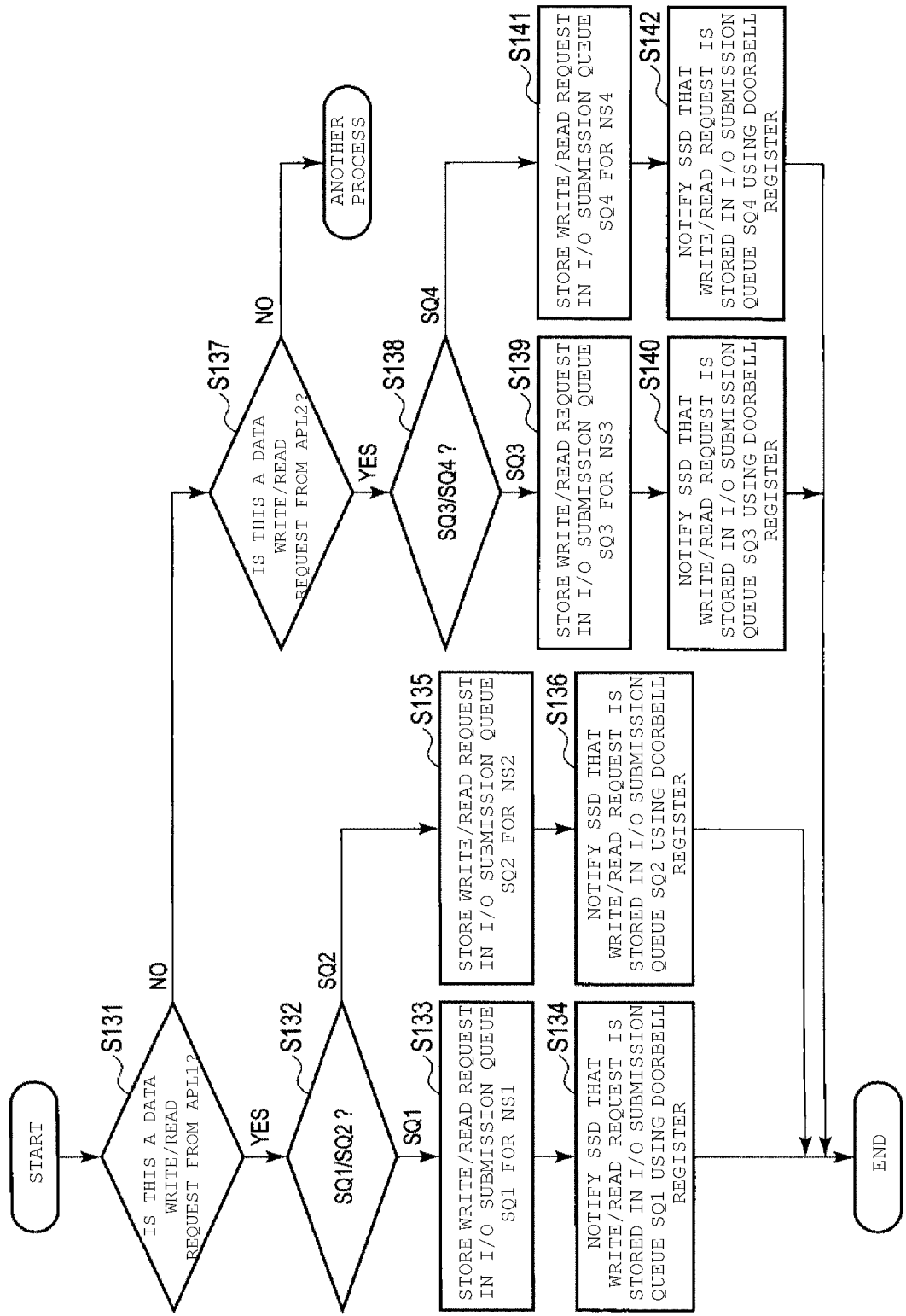
FIG. 14 is a flowchart illustrating a procedure for issuing a write/read request for each individual namespace.

FIG. 14 is a flowchart illustrating a procedure of operation of issuing the write/read request for each individual name space.

A case where the application program (APL1) 201A accesses the namespace NS1 and the namespace NS2 in parallel, and the application program (APL2) 201B accesses the namespace NS3 and the namespace NS4 in parallel will be assumed.

When the application program (APL1) 201A generates the write/read request including NSID1 of the namespace NS1, the application program (APL1) 201A designates the identifier or the memory area of the I/O submission queue (SQ1) 501A as a write target I/O submission queue to which the generated write/read request is to be stored. When the application program (APL1) 201A generates the write/read request including NSID2 of the namespace NS2, the application program (APL1) 201A designates the identifier or the memory area of the I/O submission queue (SQ2) 501A as a write target I/O submission queue to which the generated write/read request is to be stored.

Similarly, when the application program (APL2) 201B generates the write/read request including NSID3 of the namespace NS3, the application program (APL2) 201B designates the identifier or the memory area of the I/O submission queue (SQ3) 501B as a write target I/O submission queue to which the generated write/read request is to be stored. When the application program (APL2) 201B generates the write/read request including NSID4 of the namespace NS4, the application program (APL2) 201B designates the identifier or the memory area of the I/O submission queue (SQ4) 501B as a write target I/O submission queue to which the generated write/read request is to be stored.

The processor 41 of the host 2 executes the following process by executing the instruction group corresponding to the host software in the main memory 42.

In response to the write/read request from the application program (APL1) 201A (YES in step S131), the processor 41 determines whether the write target I/O submission queue designated by the application program (APL1) 201A is the I/O submission queue (SQ1) 501A or the I/O submission queue (SQ2) 501A (step S132).

When the designated write target I/O submission queue is the I/O submission queue (SQ1) 501A (SQ1 in step S132), the processor 41 stores the write/read request (write/read request including NSID1) in the I/O submission queue (SQ1) 501A allocated in the memory space 101A of the application program (APL1) 201A (steps S133 and S134). In this case, first, the processor 41 stores the write/read request from the application program (APL1) 201A in the I/O submission queue (SQ1) 501A (step S133). The processor 41 notifies the SSD 3 that a new write/read request is stored in the I/O submission queue (SQ1) 501A by accessing the doorbell register corresponding to the I/O submission queue (SQ1) 501A in the SSD 3 (step S134).

When the designated write target I/O submission queue is the I/O submission queue (SQ2) 501A (SQ2 in step S132), the processor 41 stores the write/read request (write/read request including NSID2) in the I/O submission queue (SQ2) 501A allocated in the memory space 101A of the application program (APL1) 201A (steps S135 and S136). In this case, first, the processor 41 stores the write/read request from the application program (APL1) 201A in the I/O submission queue (SQ2) 501A (step S135). The processor 41 notifies the SSD 3 that a new write/read request is stored in the I/O submission queue (SQ2) 501A by accessing the doorbell register corresponding to the I/O submission queue (SQ2) 501A in the SSD 3 (step S136).

In response to the write/read request from the application program (APL2) 201B (YES in step S137), the processor 41 determines whether the write target I/O submission queue designated by the application program (APL2) 201B is the I/O submission queue (SQ3) 501B or the I/O submission queue (SQ4) 501B (step S138).

When the designated write target I/O submission queue is the I/O submission queue (SQ3) 501B (SQ3 in step S138), the processor 41 stores the write/read request (write/read request including NSID3) in the I/O submission queue (SQ3) 501B allocated in the memory space 101B of the application program (APL2) 201B (steps S139 and S140). In this case, first, the processor 41 stores the write/read request from the application program (APL2) 201B in the I/O submission queue (SQ3) 501B (step S139). The processor 41 notifies the SSD 3 that a new write/read request is stored in the I/O submission queue (SQ3) 501B by accessing the doorbell register corresponding to the I/O submission queue (SQ3) 501B in the SSD 3 (step S140).

When the designated write target I/O submission queue is the I/O submission queue (SQ4) 501B (SQ4 in step S138), the processor 41 stores the write/read request (write/read request including NSID4) in the I/O submission queue (SQ4) 501B allocated in the memory space 101B of the application program (APL2) 201B (steps S141 and S142). In this case, first, the processor 41 stores the write/read request from the application program (APL2) 201B in the I/O submission queue (SQ4) 501B (step S141). The processor 41 notifies the SSD 3 that a new write/read request is stored in the I/O submission queue (SQ4) 501B by accessing the doorbell register corresponding to the I/O submission queue (SQ4) 501B in the SSD 3 (step S142).

As described thus far, according to the first embodiment, separate I/O queues to which each of the application program (APL1) 201A and the application program (APL2) 201B can obtain direct access are allocated in the user space 101 in response to the I/O submission queue creation request from each of the application program (APL1) 201A and the application program (APL2) 201B.

Accordingly, a collision in which the application programs access the same area in the same I/O queue allocated in the user space 101 at the same time can be avoided while the application program (APL1) 201A and the application program (APL2) 201B sharing the SSD 3 are permitted to have direct access to the I/O queue from the user space 101. Thus, access to the SSD 3 from each of the application programs sharing the SSD 3 can be more efficiently made than when the kernel 302 must be called by a system call each time it is necessary to issue the write/read request to the SSD 3.

In addition, the admin queue is not allocated in the user space 101. The admin queue is allocated in the kernel space 102 and is managed by the driver 304 in the kernel 302. Accordingly, the kernel 302 can determine whether or not the content of management requested from each of the application program (APL1) 201A and the application program (APL2) 201B is management permitted for the application. Furthermore, the kernel 302 can permit or prohibit the execution of the management based on the determination result.

Second Embodiment

A system configuration of a host 2' in a case where each of the plurality of application programs sharing the SSD 3 is a virtual machine will be described as a second embodiment.

Figure 15:
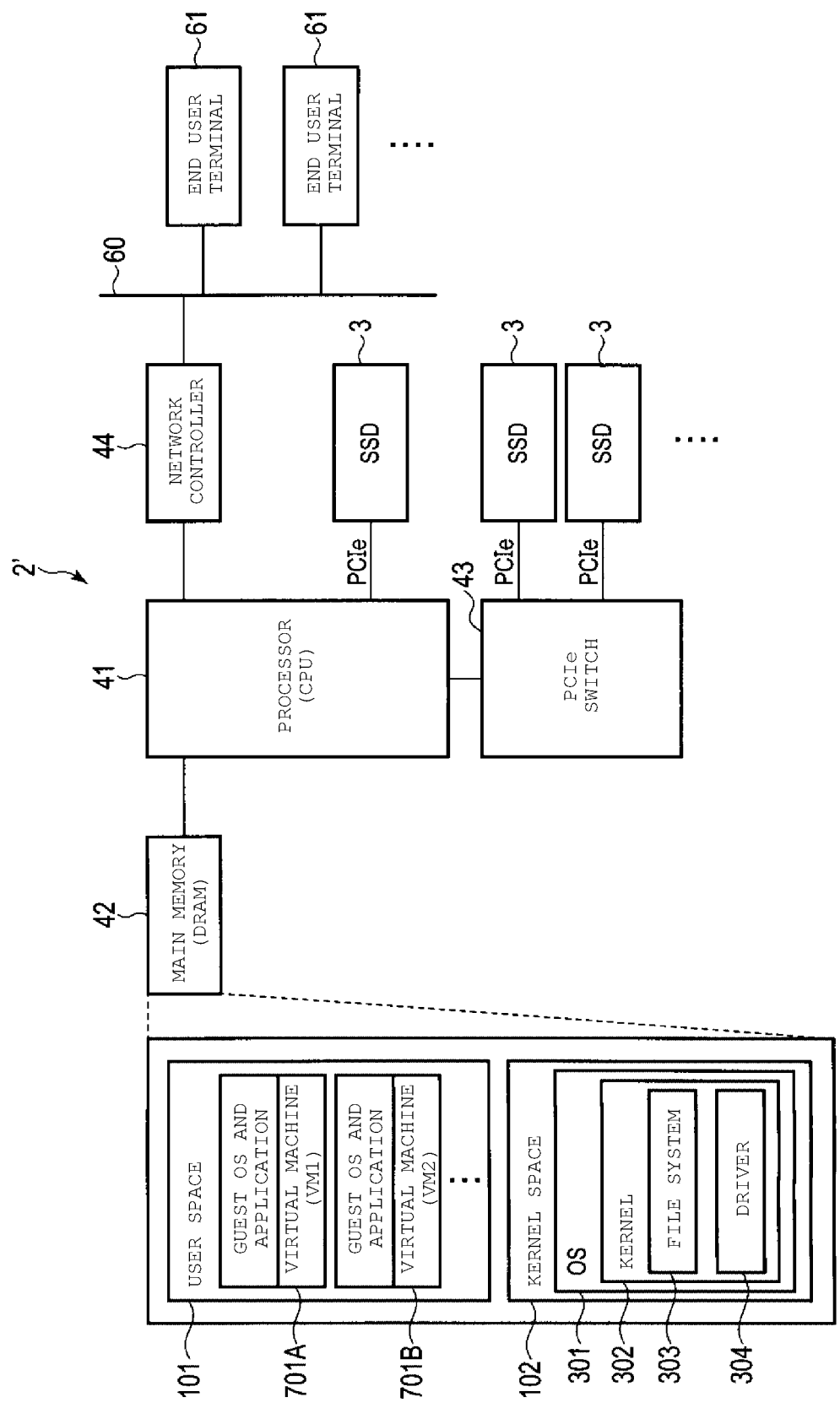
FIG. 15 is a block diagram illustrating a configuration example of an information processing apparatus according to a second embodiment.

FIG. 15 is a block diagram illustrating a configuration example of the host 2' according to the second embodiment. A hardware configuration of the host 2' is the same as the first embodiment.

In FIG. 15, a case where a virtual machine (VM1) 701A and a virtual machine (VM2) 701B sharing the SSD 3 are executed in the user space 101 arranged in the main memory 42 of the host 2' is illustrated. The virtual machine (VM1) 701A and the virtual machine (VM2) 701B execute a process for read and write access to the SSD 3.

In the virtual machine (VM1) 701A, a guest operating system and an application program corresponding to the end user terminal 61 are executed. Similarly, in the virtual machine (VM2) 701B, a guest operating system and an application program corresponding to an end user terminal 62 are executed.

Figure 16:
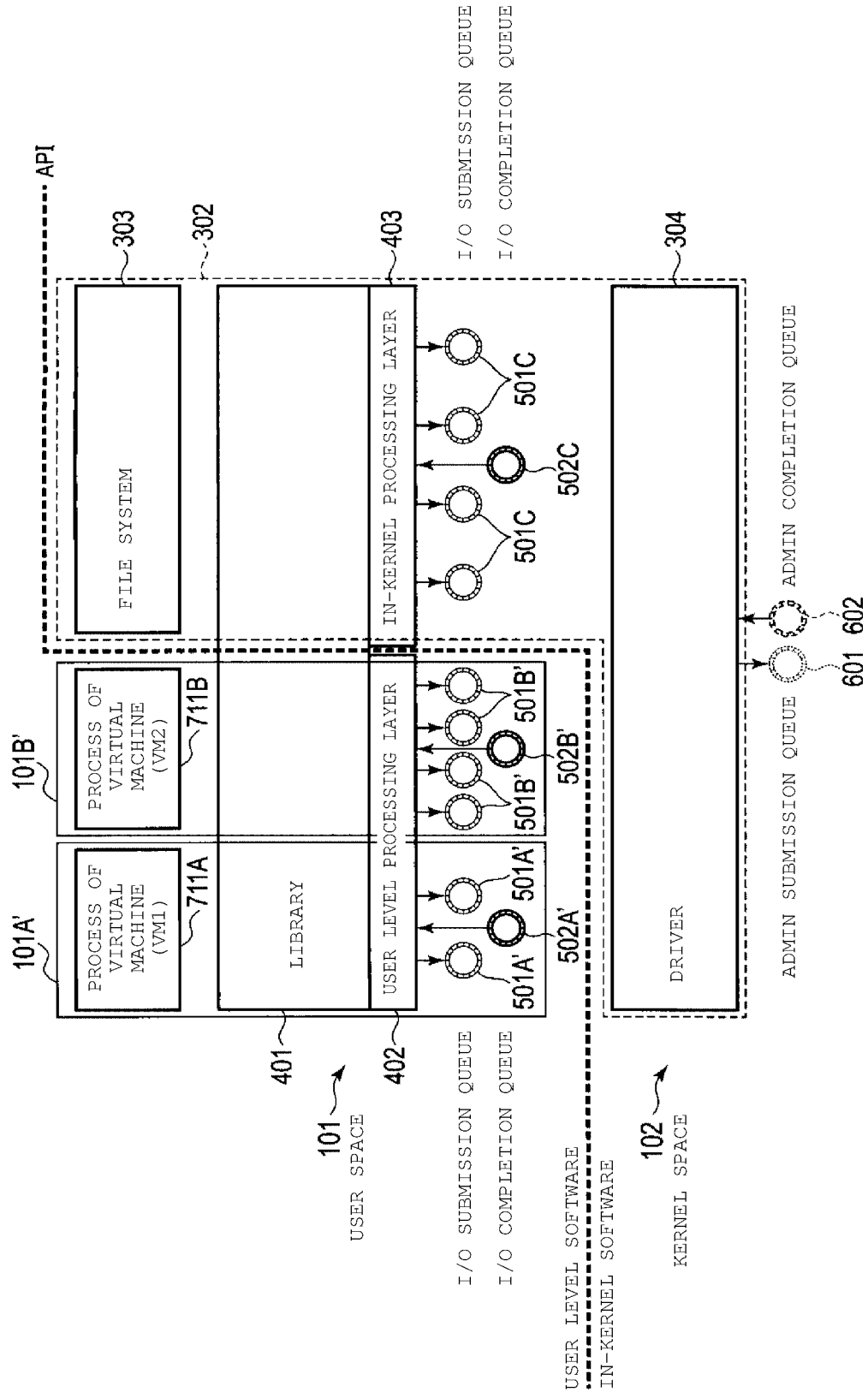
FIG. 16 is a block diagram illustrating an example of a queue management structure for allocating an I/O submission queue dedicated to each virtual machine executed in the information processing apparatus according to the second embodiment.

FIG. 16 illustrates a queue management structure for allocating an I/O submission queue dedicated to each virtual machine.

A memory space 101A' allocated to the virtual machine (VM1) 701A and a memory space 101B' allocated to the virtual machine (VM2) 701B are present in the user space 101. That is, the memory space 101A' and the memory space 101B' in the main memory 42 are allocated to the virtual machine (VM1) 701A and the virtual machine (VM2) 701B, respectively.

In the memory space 101A' allocated to the virtual machine (VM1) 701A in the main memory 42, a process 711A of the virtual machine (VM1) 701A is executed.

I/O queues (an I/O submission queue 501A' and an I/O completion queue 502A') dedicated to the virtual machine (VM1) 701A are allocated in the memory space 101A' by the processor 41.

The I/O submission queue 501A' and the I/O completion queue 502A' are mapped to the memory space 101A'. Thus, the process 711A of the virtual machine (VM1) 701A can directly store the write/read request in the I/O submission queue 501A' without calling the driver 304 of the kernel 302 using a system call. In addition, from the I/O completion queue 502A', the process 711A of the virtual machine (VM1) 701A can directly acquire the completion response from the SSD 3.

Only one I/O submission queue 501A' may be allocated in the memory space 101A' of the virtual machine (VM1) 701A. Alternatively, a plurality of I/O submission queues 501A' may be allocated in the memory space 101A'. Even in a case where the plurality of I/O submission queues 501A' are allocated in the memory space 101A', allocation of only one I/O completion queue 502A' is enough in the memory space 101A'.

The I/O submission queue 501A' is used for storing the write/read request from the virtual machine (VM1) 701A. The process 711A of the virtual machine (VM1) 701A may directly store the write/read request in the I/O submission queue 501A' or may store the write/read request in the I/O submission queue 501A' through the library 401 described in the first embodiment.

The I/O completion queue 502A' is used for receiving, from the SSD 3, the completion response to the write/read request fetched from the I/O submission queue 501A'. The process 711A of the virtual machine (VM1) 701A may directly acquire the completion response from the I/O completion queue 502A' or may acquire the completion response from the I/O completion queue 502A' through the library 401.

In the memory space 101B' allocated to the virtual machine (VM2) 701B in the main memory 42, a process 711B of the virtual machine (VM2) 701B is executed. An I/O queue (an I/O submission queue 501B' and an I/O completion queue 502B') dedicated to the virtual machine (VM2) 701B is allocated in the memory space 101B' by the processor 41.

The process 711B of the virtual machine (VM2) 701B can directly store the write/read request in the I/O submission queue 501B' without calling the driver 304 using a system call. In addition, from the I/O completion queue 502B', the process 711B of the virtual machine (VM2) 701B can directly acquire the completion response from the SSD 3.

Only one I/O submission queue 501B' may be allocated in the memory space 101B' of the virtual machine (VM2) 701B. Alternatively, a plurality of I/O submission queues 501B' may be allocated in the memory space 101B'. Even in a case where the plurality of I/O submission queues 501B' are allocated in the memory space 101B', allocation of only one I/O completion queue 502B' is enough in the memory space 101B'.

The I/O submission queue 501B' is used for storing the write/read request from the virtual machine (VM2) 701B. The process 711B of the virtual machine (VM2) 701B may directly store the write/read request in the I/O submission queue 501B' or may store the write/read request in the I/O submission queue 501B' through the library 401.

The I/O completion queue 502B' is used for receiving, from the SSD 3, the completion response to the write/read request fetched from the I/O submission queue 501B'. The process 711B of the virtual machine (VM2) 701B may directly acquire the completion response from the I/O completion queue 502B' or may acquire the completion response from the I/O completion queue 502B' through the library 401.

In the second embodiment, the I/O submission queue 501A' dedicated to the virtual machine (VM1) 701A is allocated in the memory space 101A' of the virtual machine (VM1) 701A, and the I/O submission queue 501B' dedicated to the virtual machine (VM2) 701B is allocated in the memory space 101B' of the virtual machine (VM2) 701B.

Accordingly, a collision in which the virtual machine (VM1) 701A and the virtual machine (VM2) 701B sharing the SSD 3 access the same area in the same I/O queue allocated in the user space 101 at the same time can be avoided. The write/read request or the completion response can be correctly transferred between the host 2' and the SSD 3.

In the same manner as the first embodiment, the I/O queue (the I/O submission queue 501C and the I/O completion queue 502C) for the in-kernel module such as the file system 303 is managed by the library 401. In addition, in the same manner as the first embodiment, the admin queue (the admin submission queue 601 and the admin completion queue 602) is managed by the driver 304 in the kernel 302.

An operation of creating the I/O submission queue for each virtual machine is executed using the same procedure as the procedure described in FIG. 5 in response to the I/O submission queue creation request from each virtual machine.

The data write/read operation is executed using the same procedure as the procedure described in FIG. 6 in response to the write/read request from each virtual machine.

When each virtual machine accesses a plurality of namespaces in parallel, an I/O submission queue dedicated to each namespace of the virtual machine may be allocated.

In the second embodiment, the same effect as the first embodiment can be implemented.

In the first embodiment and the second embodiment, for example, direct access from the user space 101 to the I/O queue (the I/O submission queue and the I/O completion queue) by the process of the application program operating in the user space 101 means access from the user space 101 to the I/O queue (the I/O submission queue and the I/O completion queue) by the process of the application program without using a system call.

In the first embodiment and the second embodiment, for example, direct storage of the request in the I/O submission queue by the process of the application program operating in the user space 101 means storage of the request in the II/O submission queue by the process of the application program without using a system call.

In the first embodiment and the second embodiment, for example, direct acquisition of the response from the I/O completion queue by the process of the application program operating in the user space 101 means acquisition of the response from the I/O completion queue by the process of the application program without using a system call.

The nonvolatile memory in the SSD 3 used in the first embodiment and the second embodiment is not limited to the NAND flash memory and may be, for example, a magnetoresistive random access memory (MRAM), a phase change random access memory (PRAM), a resistive random access memory (ReRAM), or a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computing device, comprising:
a memory; and
a processor connected to the memory and configured to:
create, in a first memory space of the memory, a first I/O submission queue associated with a first application running in user space;
create, in a second memory space of the memory, a second I/O submission queue associated with a second application running in user space;
in response to a first I/O request from the first application, store the first I/O request in the first I/O submission queue for access by a semiconductor storage device;
in response to a second I/O request from the second application, store the second I/O request in the second I/O submission queue for access by the semiconductor storage device;
create, in a third memory space of the memory, a management request submission queue;
in response to a first I/O queue creation request from the first application, store the first I/O queue creation request in the management request submission queue, the first I/O creation request instructing creation of the first I/O submission queue and a first I/O completion queue associated with the first application; and
in response to a second I/O queue creation request from the second application, store the second I/O queue creation request in the management request submission queue, the second I/O creation request instructing creation of the second I/O submission queue and a second I/O completion queue associated with the second application.

2. The computing device according to claim 1, wherein the processor is further configured to:
create, in a fourth memory space of the memory, a fourth I/O submission queue; and
in response to a fourth I/O request from a software module running in kernel space, store the fourth I/O request in the fourth I/O submission queue for access by the semiconductor storage device.

3. The computing device according to claim 1, wherein the first I/O submission queue is not accessible by the second application, and the second I/O submission queue is not accessible by the first application.

4. The computing device according to claim 1, wherein the first application is running in a first virtual machine that is running in user space, and the second application is running in a second virtual machine that is running in user space.

5. The computing device according to claim 1, wherein the processor is further configured to:
create, in the first memory space, a first I/O completion queue associated with the first application; and
create, in the second memory space, a second I/O completion queue associated with the second application.

6. The computing device according to claim 1, wherein the first I/O submission queue is associated with the first application and a first namespace, and the first I/O request is associated with the first namespace, and the processor is further configured to:
create, in the first memory space, a third I/O submission queue associated with the first application and a second namespace; and
in response to a third I/O request from the first application and associated with the second namespace, store the third I/O request in the third I/O submission queue for access by the semiconductor storage device.

7. The computing device according to claim 6, wherein
no I/O request associated with the second namespace is added to the first I/O submission queue, and
no I/O request associated with the first namespace is added to the second I/O submission queue.

8. The computing device according to claim 6, wherein the processor is further configured to:
create, in the first memory space, a first I/O completion queue associated with the first application; and
create, in the second memory space, a second I/O completion queue associated with the second application.

9. The computing device according to claim 1, wherein the processor is further configured to:
in response to the first I/O request being added to the first I/O submission queue, notify the semiconductor storage device that the first I/O request has been stored in the first I/O submission queue; and
in response to the second I/O request being added to the second I/O submission queue, notify the semiconductor storage device that the second I/O request has been stored in the second I/O submission queue.

10. A method for controlling access to a semiconductor storage device from applications running in user space of a computer system, the method comprising:
creating, in a first memory space, a first I/O submission queue for a first application running in user space;
creating, in a second memory space of the memory, a second I/O submission queue associated with a second application running in user space;
in response to a first I/O request from the first application, storing the first I/O request in the first I/O submission queue for access by the semiconductor storage device;
in response to a second I/O request from the second application, storing the second I/O request in the second I/O submission queue for access by the semiconductor storage device;
creating, in a third memory space of the memory, a management request submission queue;
in response to a first I/O queue creation request from the first application, storing the first I/O queue creation request in the management request submission queue, the first I/O queue creation request instructing creation of the first I/O submission queue and a first I/O completion queue associated with the first application; and
in response to a second I/O queue creation request from the second application, storing the second I/O queue creation request in the management request submission queue, the second I/O queue creation request instructing creation of the second I/O submission queue and a second I/O completion queue associated with the second application.

11. The computing device according to claim 10, further comprising:
creating, in a fourth memory space of the memory, a fourth I/O submission queue; and
in response to a fourth I/O request from a software module running in kernel space, storing the fourth I/O request in the fourth I/O submission queue for access by the semiconductor storage device.

12. The method according to claim 10, wherein the first I/O submission queue is not accessible by the second application, and the second I/O submission queue is not accessible by the first application.

13. The method according to claim 10, wherein
the first application is running in a first virtual machine in user space, and
the second application is running in a second virtual machine in user space.

14. The method according to claim 10, further comprising:
creating, in the first memory space, a first I/O completion queue associated with the first application; and
creating, in the second memory space, a second I/O completion queue associated with the second application.

15. The method according to claim 10, wherein
the first I/O submission queue is associated with the first application and a first namespace, and the first I/O request is associated with the first namespace, and the method further comprises:
creating, in the first memory space, a third I/O submission queue associated with the first application and a second namespace; and
in response to a third I/O request from the first application and associated with the second namespace, storing the third I/O request in the third I/O submission queue for access by the semiconductor storage device.

16. The method according to claim 15, wherein
no I/O request associated with the second namespace is added to the first I/O submission queue, and
no I/O request associated with the first namespace is added to the second I/O submission queue.

17. The method according to claim 15, further comprising:
creating, in the first memory space, a first I/O completion queue associated with the first application, a first I/O completion response from the semiconductor storage device being stored in the first I/O completion queue upon completion of the first I/O request; and
creating, in the second memory space, a second I/O completion queue associated with the second application, a second I/O completion response from the semiconductor storage device being stored in the second I/O completion queue upon completion of the second I/O request and a third I/O completion response from the semiconductor storage device being stored in the second I/O completion queue upon completion of the third I/O request.

18. The method according to claim 10, further comprising:
in response to the first I/O request being added to the first I/O submission queue, notifying the semiconductor storage device that the first I/O request has been stored in the first I/O submission queue; and
in response to the second I/O request being added to the second I/O submission queue, notifying the semiconductor storage device that the second I/O request has been stored in the second I/O submission queue.

19. A computing device, comprising:
a memory; and
a processor connected to the memory and configured to:
create, in a first memory space of the memory, a first I/O submission queue associated with a first application running in user space and a first namespace;
create, in a second memory space of the memory, a second I/O submission queue associated with a second application running in user space;
create, in the first memory space, a third I/O submission queue associated with the first application and a second namespace;
in response to a first I/O request associated with the first namespace from the first application, store the first I/O request in the first I/O submission queue for access by a semiconductor storage device;

in response to a second I/O request from the second application, store the second I/O request in the second I/O submission queue for access by the semiconductor storage device; and in response to a third I/O request associated with the second namespace from the first application, store the third I/O request in the third I/O submission queue for access by the semiconductor storage device.

20. The computing device according to claim 19, wherein no I/O request associated with the second namespace is added to the first I/O submission queue, and no I/O request associated with the first namespace is added to the second I/O submission queue.

* * * * *